United States Patent [19]
Honbo et al.

[11] Patent Number: 5,677,725
[45] Date of Patent: Oct. 14, 1997

[54] IMAGE FORMING APPARATUS AND METHOD PERFORMING A HALFTONE IMAGE BY PULSE-WIDTH MODULATION

[75] Inventors: Tsunao Honbo, Kawasaki; Takashi Suzuki, Tokyo; Tetsuya Nakamura, Kawasaki, all of Japan

[73] Assignee: Canon Kabushiki Kaisha, Tokyo, Japan

[21] Appl. No.: 200,656

[22] Filed: Feb. 23, 1994

[30] Foreign Application Priority Data

| Feb. 25, 1993 | [JP] | Japan | 5-036330 |
| Mar. 26, 1993 | [JP] | Japan | 5-067190 |
| Apr. 6, 1993 | [JP] | Japan | 5-079858 |
| May 24, 1993 | [JP] | Japan | 5-121205 |

[51] Int. Cl.$^6$ ............................................. B41J 2/47
[52] U.S. Cl. ............................ 347/252; 347/144; 358/298
[58] Field of Search ................................. 347/247, 252, 347/240, 144; 358/296, 298, 300, 302

[56] References Cited

U.S. PATENT DOCUMENTS

| 5,283,658 | 2/1994 | Hayashi et al. | 358/296 |
| 5,432,611 | 7/1995 | Haneda et al. | 358/298 |
| 5,436,644 | 7/1995 | Motoi et al. | 358/296 |

*Primary Examiner*—Mark J. Reinhart
*Attorney, Agent, or Firm*—Fitzpatrick, Cella, Harper & Scinto

[57] ABSTRACT

An image forming apparatus in which two delay time generators input data for two delay times, and a reference signal, and outputs two pulse signals having predetermined pulse-widths. A pulse generator generates a pulse signal based on the phase difference between the two output pulse signals. The pulse-width and pulse position of the generated pulse signal is arbitrarily controlled by the two output pulse signals.

15 Claims, 21 Drawing Sheets

IMAGE FORMING APPARATUS AND METHOD PERFORMING A HALFTONE IMAGE BY PULSE-WIDTH MODULATION

BACKGROUND OF THE INVENTION

The present invention relates to an image forming apparatus such as a copying machine and a laser-beam printer which performs electrophotographic image formation and, more particularly, to an image forming apparatus for forming a halftone image by pulse-width modulation.

Conventionally, as a pulse-width modulation method, modulation using a plurality of triangular wave generators corresponding to respective pulse frequencies to generate triangular waves, and using a comparator to compare the generated triangular waves with an analog video input signal, thus generating pulse-width modulated signals, is known. In this method, one of the modulated signals is selected corresponding to a screen data (the number of lines) value in input pixel frequency units, and is outputted as a pulse-width modulation signal.

In this manner, the method for pulse-width modulation of an image signal by changing the triangular wave frequency is specifically advantageous in a case where laser-beam on/off control is performed for electrophotographic image formation.

That is, the above method can be used to improve tonality of by lengthening the period of the triangular wave, further, the method can be used to improve resolution by shortening the period of the triangular wave. By selectively using the triangular wave in correspondence with the type of image data (character data, picture data etc.), an excellent image representation is provided.

However, as the above conventional pulse-width modulation method employs different triangular waves for character image data and photographic image data, two triangular generators are required. This causes problems such as complexity of the associated circuit configuration and an increase in cost of the apparatus.

Further, in the conventional method using the triangular wave, if high-speed processing is attempted, there may be difficulty in obtaining sufficient amplitude of the triangular wave due to shortened triangular wave duration, and the linearity of the waveform may be deformed, thus degrading image reproducibility.

SUMMARY OF THE INVENTION

The present invention has been made in consideration of the drawbacks of the above conventional method, and has as its object to provide an image forming apparatus which improves image reproducibility.

Another object of the present invention is to provide an image forming apparatus which simplifies the construction of a triangular wave generator for pulse-width modulation.

According to the present invention, the foregoing objects are attained by providing an image forming apparatus which performs pulse-width modulation on an image signal inputted in synchronization with a reference clock signal, comprising: including delay time determination means for determining delay time with respect to the reference clock signal in correspondence with the input image signal; reference signal generation means for generating a reference signal of a predetermined period based on the reference clock signal; first signal generation means for generating a first pulse signal having a first delay based on the delay time, with respect to the reference signal; second signal generation means for generating a second pulse signal having a second delay based on the delay time, with respect to the reference signal; and third signal generation means for generating a third pulse signal, at a predetermined position within a predetermined period of the reference signal, and having a predetermined pulse-width, based on the first and second pulse signals, wherein the image forming apparatus performs the pulse-width modulation in accordance with the third pulse signal.

According to an aspect of the present invention, the first and second signal generation means change an occurrence rate of the first and second pulse signals within the predetermined period of the reference signal, at each period of the reference signal, in correspondence with the image signal.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

[First Embodiment]

Figure 1:
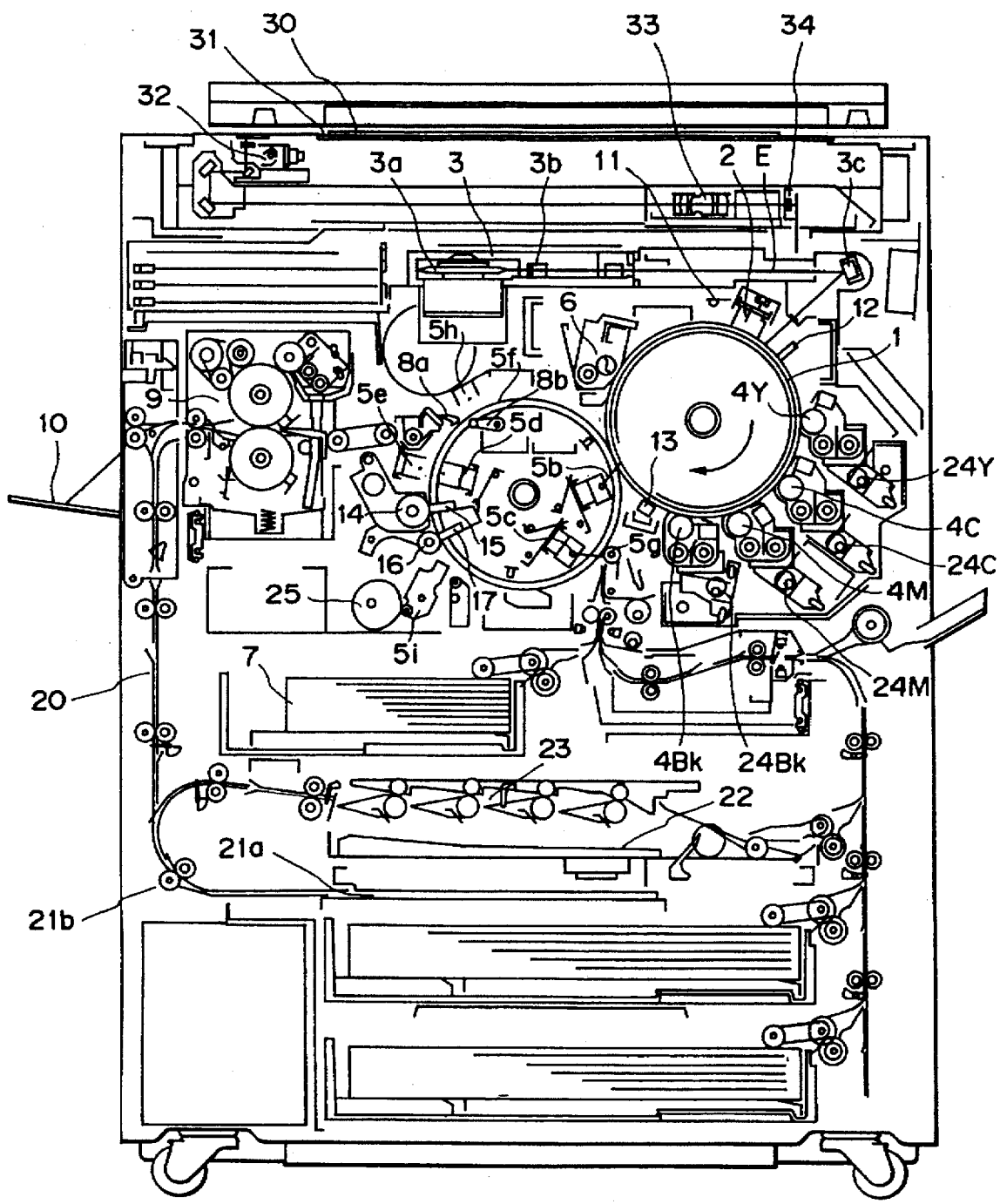
FIG. 1 is a cross-sectional view showing the construction of a color image forming apparatus according to a first embodiment of the present invention.

FIG. 1 is a cross-sectional view showing a color image forming apparatus according to the first embodiment. As shown in FIG. 1, the image forming apparatus has a digital color image reader (hereinafter referred to as "reader") in its upper portion, and a digital color image printer (hereinafter referred to as "printer") in its lower portion.

In the reader, an original 30 is placed on a platen 31 and is scanned with an exposure lamp 32. A lens 33 focuses the reflection light image from the original 30 on a full-color sensor 34, thus obtaining an RGB color component image signal which is, through an amplifier (not shown), processed by a video processing unit (not shown) and transferred to the printer.

In the printer, an electrostatic drum 1, which is an image holder, rotates in a direction represented by an arrow in FIG. 1. Around the electrostatic drum 1, a front exposure lamp 11, a corona charger 2, a laser exposure system 3, a potential sensor 12, developers 4Y, 4C, 4M and 4Bk for the four different colors, a light quantity detector 13, a transfer unit 5, and a cleaning unit 6 are provided.

In the laser exposure system 3, a laser output unit (not shown) converts the image signal from the reader into an optical signal and a polygon mirror 3a reflects the signal, to project the signal through lenses 3b and 3c, on the surface of the electrostatic drum 1.

Upon forming an image in the printer, the electrostatic drum 1 rotates in the direction represented by the arrow. The front exposure lamp 11 eliminates electrical charge from the electrostatic drum 1, thereafter, the charger 2 charges the drum 1. A light image E is irradiated upon the electrostatic drum 1 for each color component, thus forming a latent image.

Next, one of predetermined developers develops the latent image on the electrostatic drum 1 and forms a toner image, having resin as its base, on the electrostatic drum 1. The developers approach the electrostatic drum 1 in an alternative way, with respect to one of the color components, by operation of eccentric cams 24Y, 24C, 24M and 24Bk.

A recording medium cassette 7 transfers the toner image on the electrostatic drum 1 via a conveying system and a transfer unit 5 to a recording medium provided at a position opposite to the electrostatic drum 1. The transfer unit 5 comprises a transfer drum 5a, a transfer charger 5b, a electrostatic charger 5c for attaching the recording medium on the drum by static electricity, an assisting roller 5g opposite of the electrostatic charger 5c, an inner charger 5d, and an outer charger 5e. A recording medium holding sheet 5f, which is made of a dielectric, is integrally provided in a cylindrical form around the transfer drum 5a which is rotatable around its axis. Note that a dielectric sheet, e.g., a polycarbonate film is used as the recording medium holding sheet 5f.

When the drum-shaped transfer device, i.e., the transfer drum 5a rotates, the toner image on the electrostatic drum is transferred by the transfer charger 5b onto the recording medium held on the recording medium holding sheet 5f.

Thus, the desired number of color images are transferred onto the recording medium conveyed by the recording medium holding sheet 5f, thus forming a full-color image.

Upon forming a full-color image, as transfer of the toner images of four colors have been completed, a separation claw 8a, a separation roller 8b, and a separation charger 5h separate the recording medium from the transfer drum 5a, and conveys the recording medium, via a heat roller fuser 9, to a tray 10. On the other hand, a cleaning unit 6 cleans the residual toner on a surface of the electrostatic drum 1. Thereafter, the image forming steps repeat.

When images are formed on both surfaces of the recording medium, a convey path switching guide 19 is driven immediately after the recording medium is discharged from the fuser 9. The recording medium is conveyed through a vertical conveying path 20 to a reversing path 21a. Thereafter, a reversing roller 21b rotates to convey the recording medium, in a reverse direction, to the direction where the recording medium has been initially conveyed to the reversing path 21a, from the bottom side of the medium, to an intermediate tray 22. Then, another image is formed on the other surface of the recording medium by the above-mentioned image forming step.

To prevent adhesion of toner to the recording medium holding sheet 5f and adhesion of oil to the recording medium, cleaning is performed using a fur brush 14, a backup brush 15 opposite to the fur brush 14 via the recording medium holding sheet 5f, an oil elimination roller 16, a backup brush 17 opposite to the oil elimination roller 16 via the recording medium holding sheet 5f. This cleaning is usually performed before/after image formation, and is performed whenever a paper jam occurs.

In this embodiment, an eccentric cam 25 operates at the desired timing to operate a cam follower 5i integrated with the transfer drum 5f, to arbitrarily set a gap between the recording medium holding sheet 5a and the electrostatic drum 1. For example, when the apparatus is in a stand-by status, or when the power is turned off, the gap between the transfer drum and the electrostatic drum is made wider.

Next, a laser driving system of the color image forming apparatus having the above construction will be described below.

Figure 2:
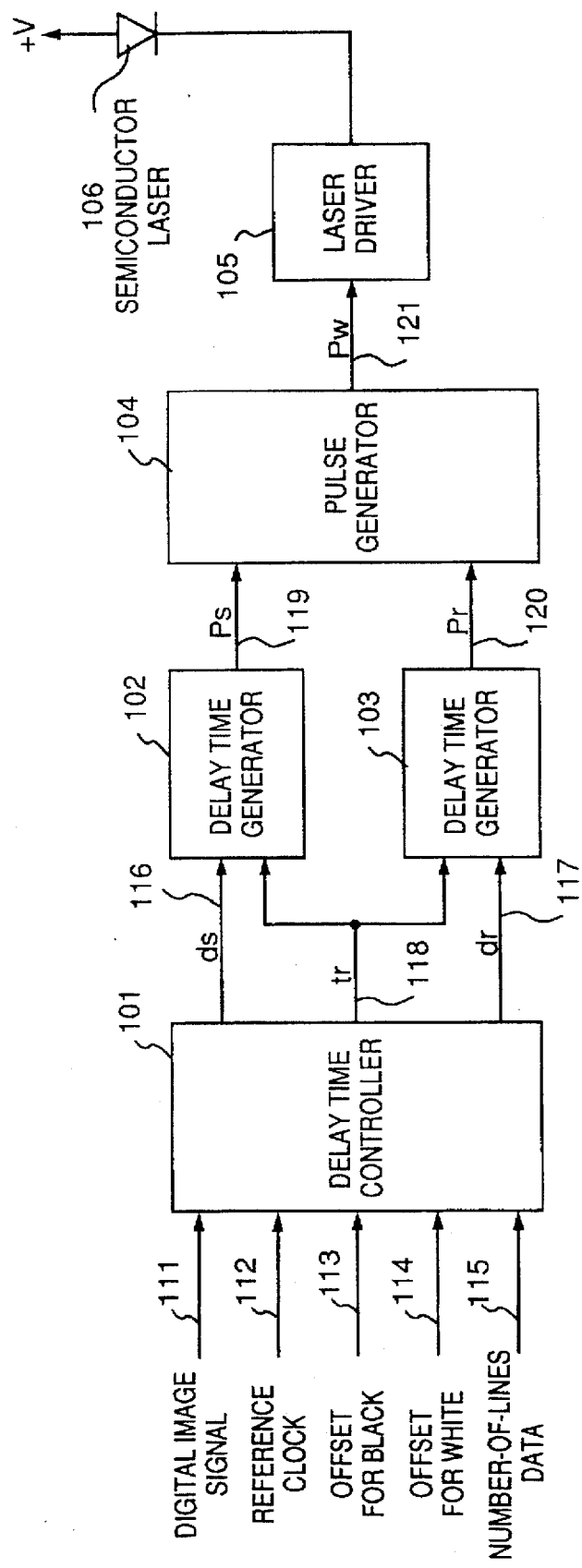
FIG. 2 is a block diagram showing a laser driving system of the color image forming apparatus.

FIG. 2 is a block diagram showing the laser driving system of the apparatus.

In FIG. 2, reference numeral 111 denotes a digital image signal inputted into a delay time controller 101 in synchronization with a reference clock 112. The delay time controller 101 inputs the digital image signal 111, the reference clock 112, an offset amount 113 for black, an offset amount 114 for white, and number-of-lines of data 115, and outputs delay time data ds 116, dr 117 and a reference signal tr 118.

The black offset amount 113 and the white offset amount 114 are values indicating pulse-widths required for a laser driving corresponding to the maximum and the minimum value of the digital image signal 111, respectively. The number-of-lines of data 115 indicates the number of screen lines of an output image, which represents as to whether the digital image signal 111 is character data or picture data.

Delay time generators 102 and 103 input the delay time data ds 116 and dr 117, and the reference signal tr 118, and then output signals Ps 119 and Pr 120 having a predetermined pulse-width which lag the reference signal tr by times of ds and dr, respectively. A pulse generator 104 generates a signal Pw 121 having a pulse-width corresponding to a phase difference between the input pulse signals Ps 119 and Pr 120.

More specifically, the pulse generator 104 is a flip-flop with set/reset, where the pulse signal Ps 119 which acts as a set pulse signal determines the rising edge of the output pulse signal Pw 121, while the pulse signal Pr 120 as a reset pulse signal determines the falling edge of the output pulse signal Pw 121.

That is, the pulse-width and the position of the output pulse signal Pw 121 can be arbitrarily controlled by the pulse signals Ps 119 and Pr 120.

It should be noted that in FIG. 2, reference numeral 105 denotes a laser driver; 106, a semiconductor laser; and +V, the power supplied to the semiconductor laser 106. The laser driver 105 turns the semiconductor laser 106 on and off for a time period corresponding to the pulse-width of the input pulse signal Pw 121.

Figure 3:
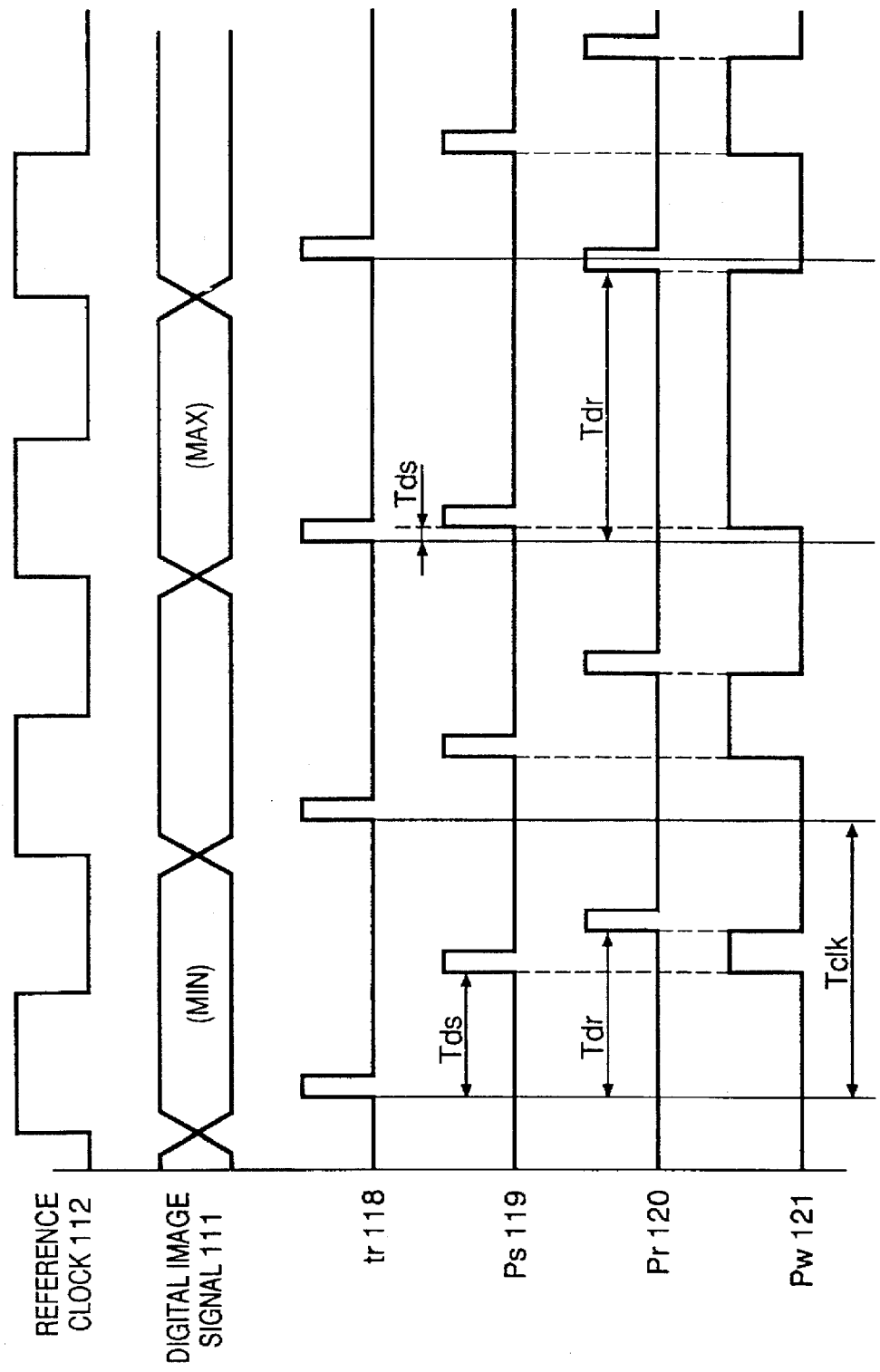
FIG. 3 is a timing chart showing respective signal timings where a digital image signal indicates character data.

FIG. 3 is a timing chart showing the respective signal timings in a case where the digital image signal indicates character data. As shown in FIG. 3, the reference signal tr 119 is generated in synchronization with the rising edges of the reference clock 112.

For example, as shown in FIG. 3, when the digital image signal value changes from the minimum to the maximum, the pulse signal Pw 121 to be generated can be controlled to expand its pulse-width within each period of reference signal tr 118. That is, if a period of time between the rising edge of the reference signal tr 118 and the rising edge of the pulse signal Ps 119 is defined as a delay time Tds, and a period between the rising edge of the reference signal tr 118 and the rising edge of the pulse signal Pr 120 as a delay time Tdr, the values of the delay time data ds 116 and dr 117 are determined so as to satisfy the following relation:

$$Tds+Tdr=T_{clk} \quad (1)$$

($T_{clk}$ corresponds to one period of tr)

Then, the pulse signal Pw 121 is generated in accordance with the phase difference between the pulse signals Ps 119 and Pr 120.

Figure 4:
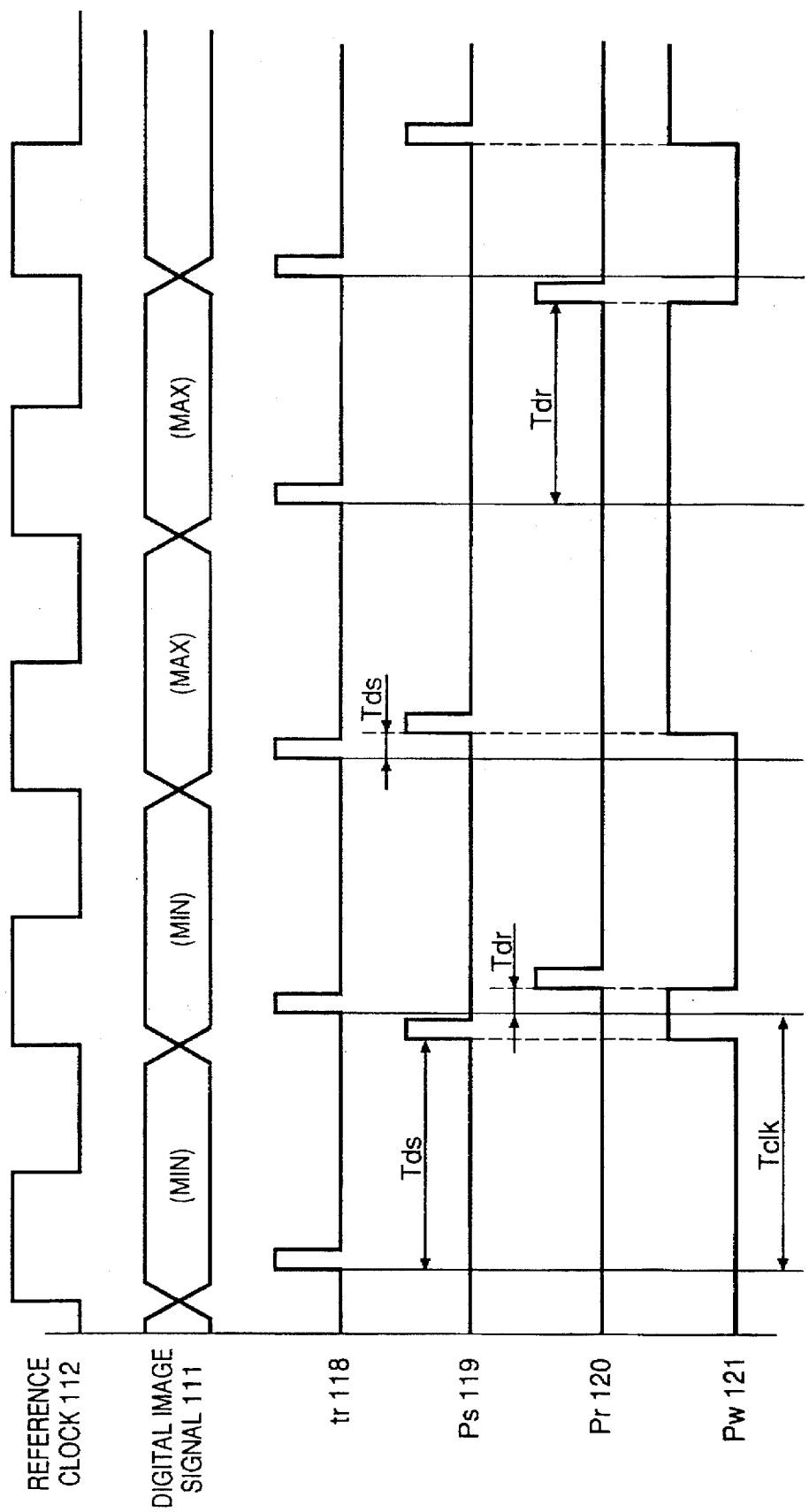
FIG. 4 is a timing chart showing signal waveforms where the digital image signal indicates picture data.

FIG. 4 is a timing chart showing the signal waveforms at the respective elements in the case where the digital image signal indicates picture data. As shown in FIG. 4, the pulse signals Ps 119 and Pr 120 are generated at a timing of one pixel apart with respect to the reference signal tr 118, that is, every second period of the period of the signal tr, thus alternatively obtaining early occurrence and late terminating pulses.

Note that either one of the delay time data ds 116 or dr 117 is employed for the pulse-width control of the output pulse signal Pw 121 within a period corresponding to one pixel in an alternative manner, which enables to obtain effects similar to those obtaining by using a lengthened pulse of a conventional triangular wave and image reproduction of excellent tonality.

In this method, even if a digital signal indicative of the mixture of character data and picture data is inputted, a mode change in pixel units can be made by simply changing the control of the delay time data ds 116 and dr 117.

It should be noted that in this case, the pulse signal Pw 121 is generated based on the phase difference between the pulse signals Ps 119 and Pr 120.

Figure 5:
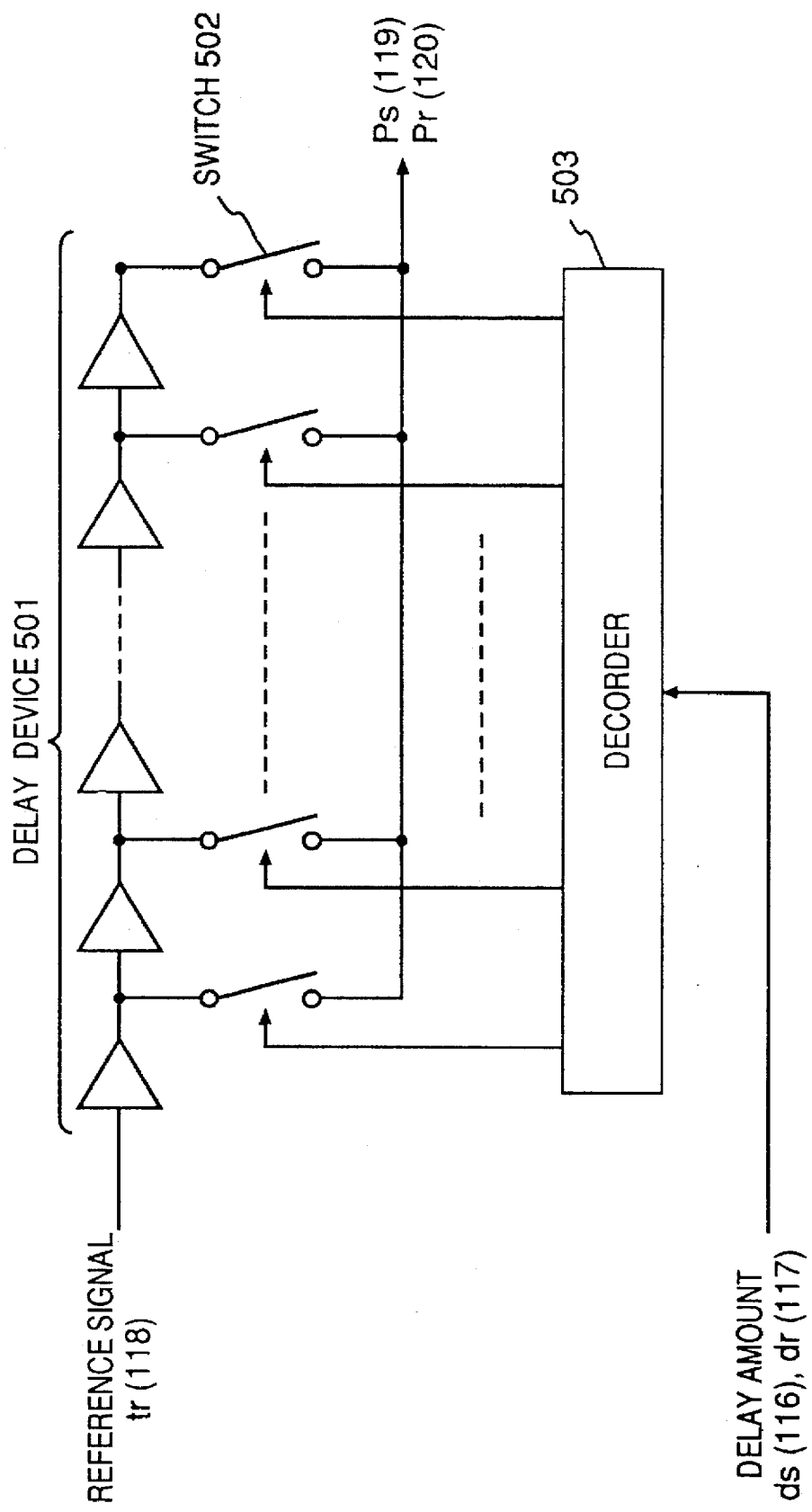
FIG. 5 is a block diagram showing as an example of the construction of a delay time generator.

FIG. 5 is a block diagram showing the construction of the delay time generators 102 and 103.

The delay time data ds 116 or dr 117 outputted from the delay time controller 101 is inputted to a decoder 503, which converts the data into a control signal for selecting one or more of the switches 502. The reference signal tr 118 outputted from the delay time controller 101 passes through a delay device 501, where the delay time is determined by the switches 502 controlled in correspondence with the delay time data ds 116 or dr 117. The delay device outputs the pulse signals Ps 119 and Pr 120 which lag the reference signal tr 118 by necessary time.

More specifically, the delay device 501 comprises cascaded gates made in a CMOS or ECL configuration. The delay amount can precisely be defined by forming these gates on a single IC chip.

Also, the switches 502 and the decoder 503 can be formed on the same IC chip mentioned above, thus realizing one-chip delay time generators 102 and 103.

Further, the number of the gates forming the delay device 501 is far grater than the number of tones in the digital image signal. Accordingly, the delay time corresponding to the maximum or the minimum value of the digital image signal can be substantially divided by the number of tones. That is, the delay time data ds 116 and dr 117 can be obtained from a predetermined calculation using the digital image signal 111, the black offset amount 113, the white offset amount 114 and the number-of-lines data 115.

As the above calculation is performed in pixel units, the delay time controller 101 includes a memory look-up table (not shown) in which calculated results corresponding to input values are pre-stored. The high-speed calculation can be made by referring to this look-up table.

In this manner, by generating pulse signals having different delay times, in accordance with a reference clock signal, and performing pulse-width modulation on an output pulse signal based on the generated pulse signals, it is possible to arbitrarily control the position and the pulse-width of the output pulse within one period of the reference clock signal, thus enabling different tone representations by a single pulse-width modulator. As the apparatus does not need separate pulse-width modulators for character data and picture data, simplification in construction and cost reduction of the apparatus can be attained. Modifications to the first embodiment will be described below. The apparatus according to the modifications has a construction identical to that of the first embodiment, therefore, the illustration and explanation of the construction will be omitted.

<First Modification>

The pulse-width modulation method according to this modification, where the digital image signal indicates character data, will be described with reference to a timing chart of FIG. 6.

Figure 6:
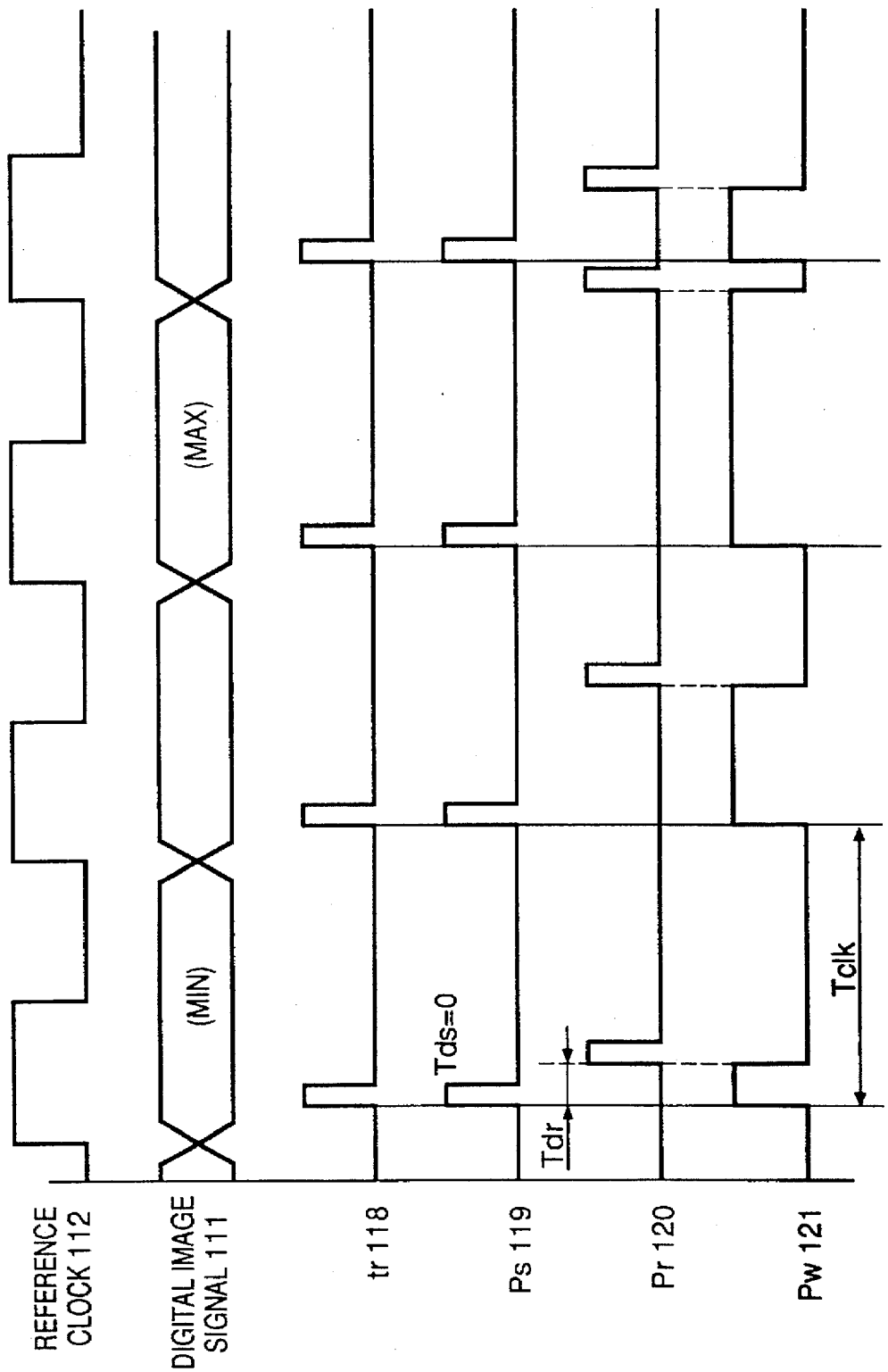
FIG. 6 is a timing chart showing the respective signal timings based on a pulse-width modulation according to a first modification of the first embodiment, where the digital image signal indicates character data.

As shown in FIG. 6, in this modification, the pulse signal Ps 119 has the same frequency and the same pulse-width as those of the reference signal tr 118. Circuit configuration of a laser driving system the modification is such that the delay time data ds is fixed to make the delay time between the signal tr and the signal Ps (Tds in FIG. 3) zero ("0"). Otherwise, the signal Ps can also be obtained in such a manner that the reference signal tr 118 is directly inputted to the pulse generator 104 as the pulse signal Ps 119, by bypassing the delay time generator 102 (FIG. 2).

If the pulse signal Ps 119 is fixed and only the pulse signal Pr 120 is used for pulse-width control, as shown in FIG. 6, the output pulse Pw 121 can be obtained which is expanded along with a time axis at every rising edge of the reference signal tr 118. That is, the pulse position within a period corresponding to one pixel can be controlled to extend from the rising edge of the pulse in accordance with the change in the digital image signal. This enables tone representation different from that of the first embodiment.

Similarly, the pulse position within a period corresponding to one pixel can be controlled to extend from the side of the falling edge of the pulse in accordance with the change in the digital image signal. In this case, the delay time Tdr between the reference signal tr 118 and the pulse signal Pr 120 is equal to the period $T_{clk}$ of the reference signal tr, the delay time data dr 117 is fixed, and only the delay time data ds 116 is used for the pulse-width control.

<Second Modification>

This modification uses a different pulse-width modulation method where the digital image signal indicates picture data.

Figure 7:
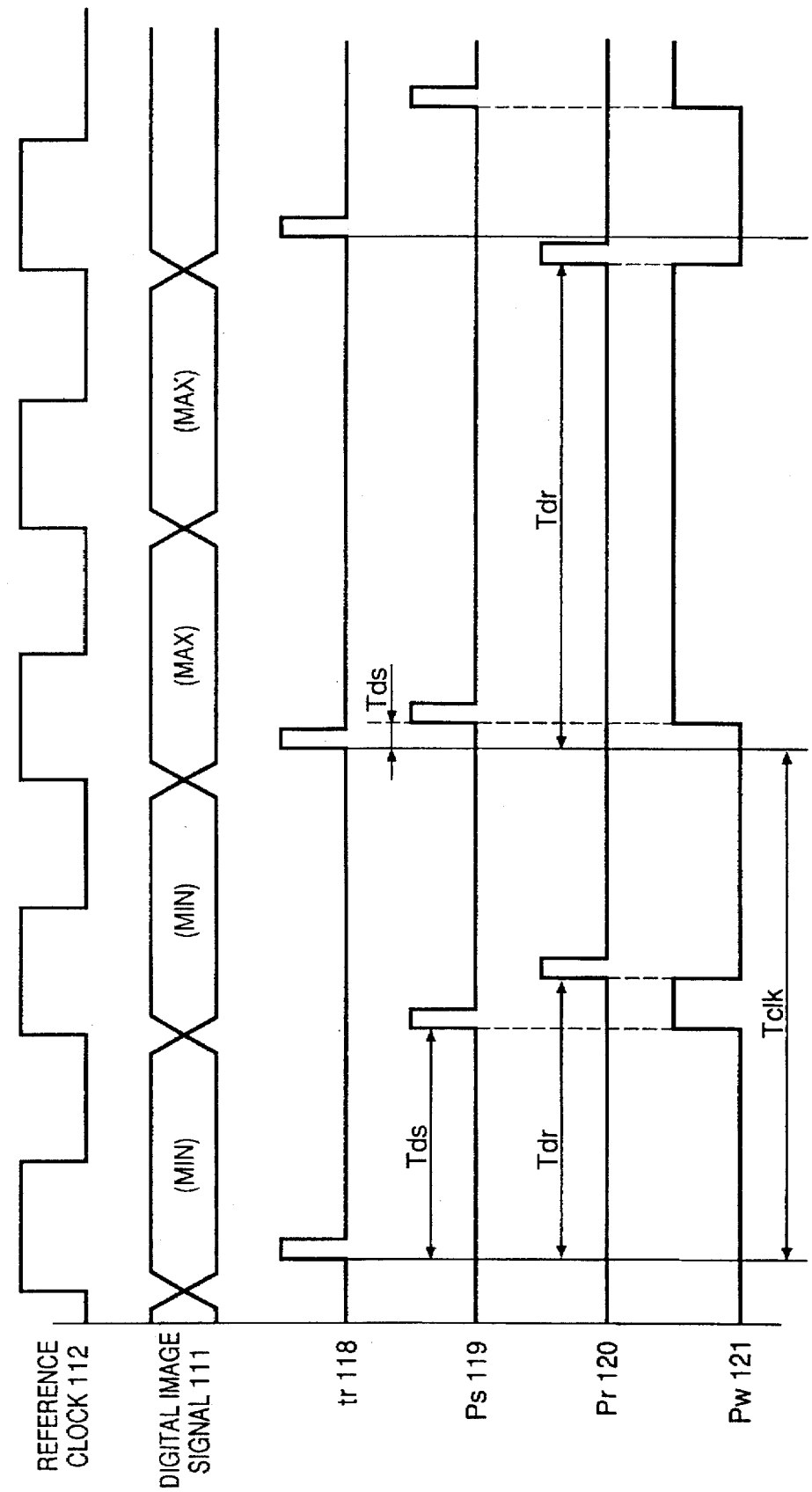
FIG. 7 is a timing chart showing the respective signal waveforms in a second modification of the first embodiment.

FIG. 7 is a timing chart showing the respective waveforms of a system according to the second modification.

In the first embodiment, the reference signal tr 118 is generated in synchronization with each rising edge of the reference clock 112. In this modification, the reference signal tr 118 is generated in synchronization with every other rising edge of the reference clock 112. As shown in FIG. 7, a pair of pulse signals Ps 119 and Pr 120 is provided with respect to a single reference signal (the signal tr 118), so that the pulse-width control method for a character mode and a picture mode simply depends on the frequency of the reference signal tr 118. Thus unification of the pulse-width control method can be accomplished.

Figure 8:
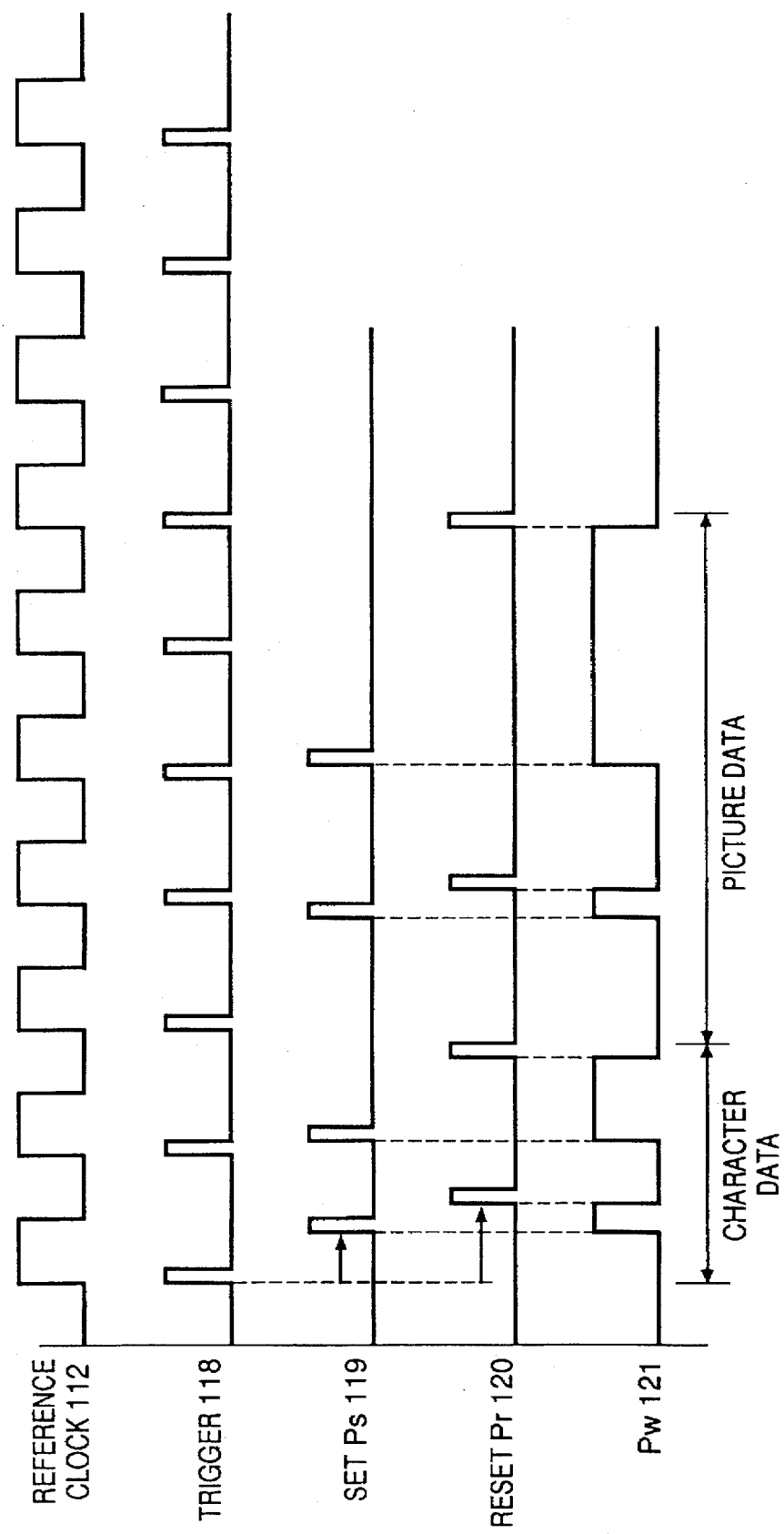
FIG. 8 is a timing chart showing the respective waveforms where character data and picture data are mixed as the digital image signal.

In the first embodiment, signal timings are separately shown for character data and picture data. According to this modification, it is capable of processing both the character data and picture data, even though these data are continuously sent to the system, by simply changing the output timing of the delay time data ds and dr at the delay time controller 101. FIG. 8 shows the signal timings in a case where character data the picture data are mixed in digital image data. In FIG. 8, the respective signals are outputted at similar timings to those of signals shown in the first embodiment.

<Third Modification>

In the first embodiment, the trigger (reference) signal tr is generated at each period of the reference clock (at each rising edge of the reference clock), and generation of the set signal Ps and the reset signal Pr within the same period of the reference clock is limited to once. However, in the third modification, the generation of the set signal Ps and the reset signal Pr can be performed plural times within one period of the reference clock, to form arbitrary tone data.

The third modification for forming arbitrary tone data will be described below.

Figure 9:
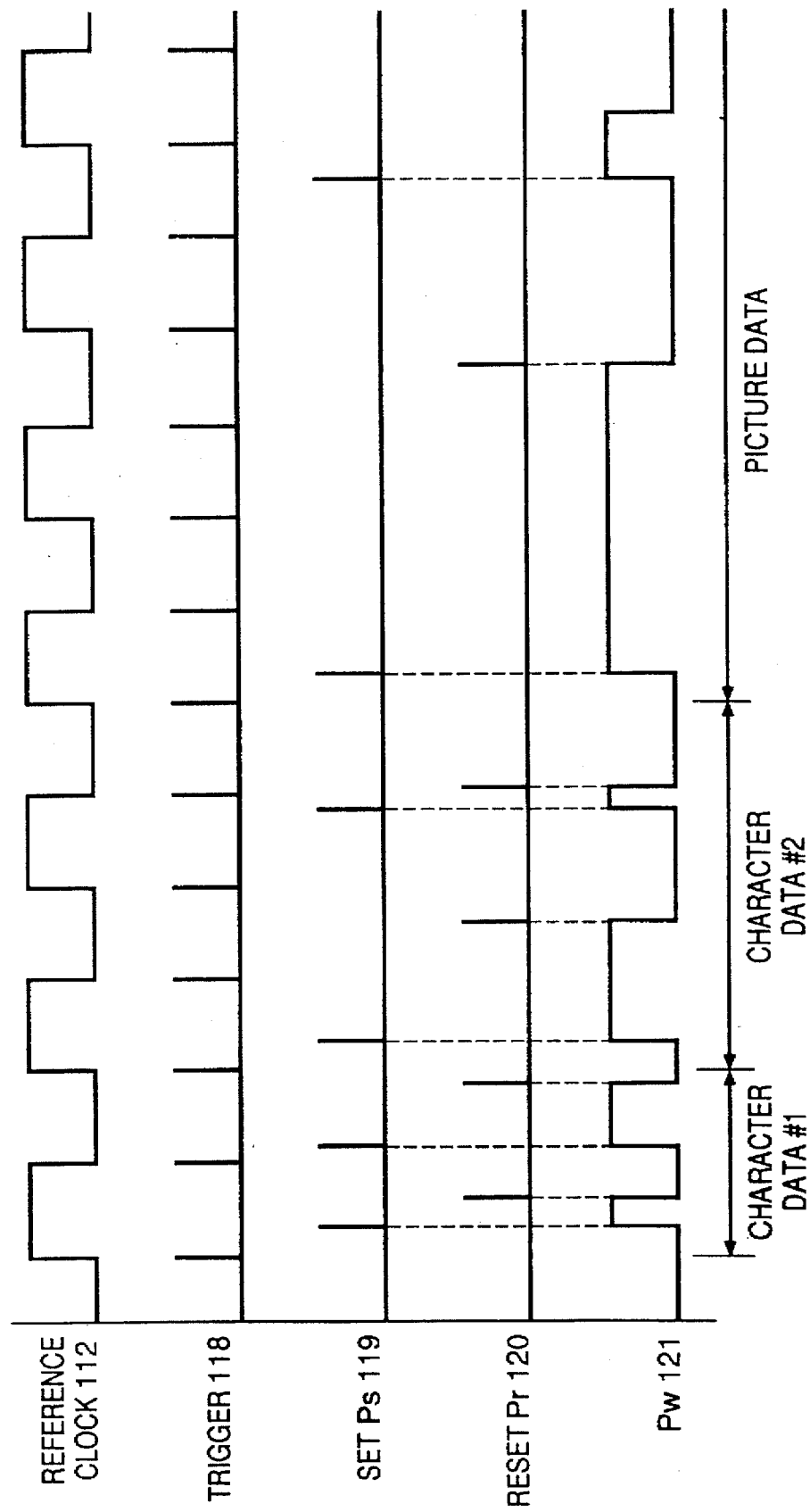
FIG. 9 is a timing chart showing the waveform of the digital image signal where the character data and picture data are mixed.

FIG. 9 is a timing chart showing the signal timings in a case where character data and picture data and are mixed as digital image data. In this modification, the set signal Ps 119 and the reset signal Pr 120 are generated plural times within the same period of the reference clock 112. The trigger signal tr 118 is generated at each rising edge and falling edge of the reference clock 112 to form arbitrary tone data. The delay times ds and dr are set based on the generated trigger signal tr 118. Thus, the digital image signal can be converted to data having three types of tone representations (i.e., character data #1, character data #2 and picture data in FIG. 9).

<Fourth Modification>

In the third modification, the trigger signal tr is outputted at fixed period in synchronization with the reference clock. A similar effect can be obtained by changing the period for generating the trigger signal tr in correspondence with an inputted digital image signal.

Figure 10:
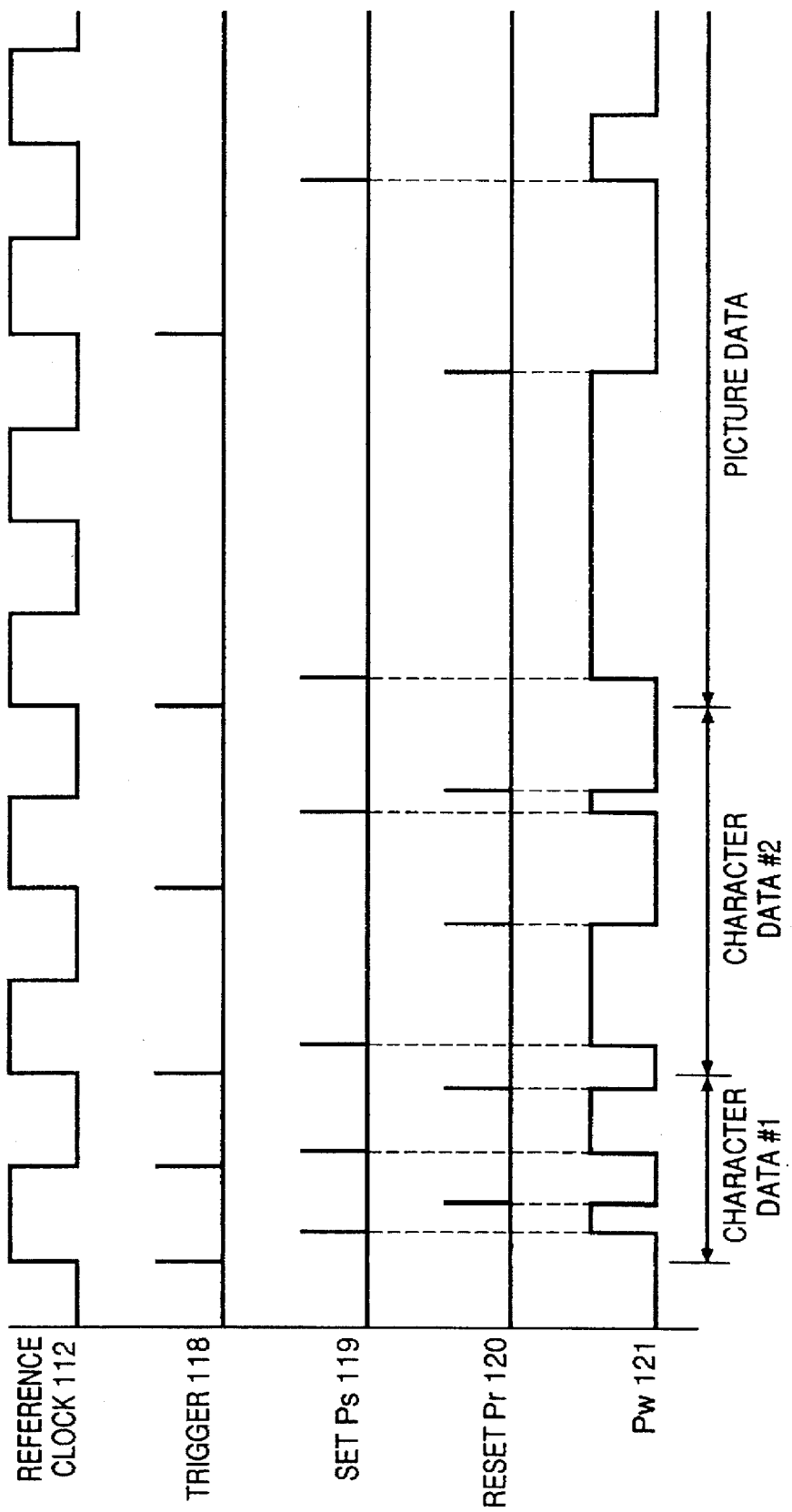
FIG. 10 is a timing chart showing the timings of the respective signals where the digital image signal indicates character data.

FIG. 10 shows the fourth modification signal timings of this case. In this example, if the digital image signal indicates character data #1, the trigger signal 118 is generated at every rising edge and falling edge of the reference clock 112; in case of character data #2, the signal 118 is generated at every period of the reference clock 112; and in case of picture data, the signal 118 is generated at every second period of the reference clock 112.

According to the first to fourth modifications, a simple circuit configuration for a pulse-width modulation can be provided for generating a pulse signal capable of coping with both character data and picture data.

[Second Embodiment]

Figure 11:
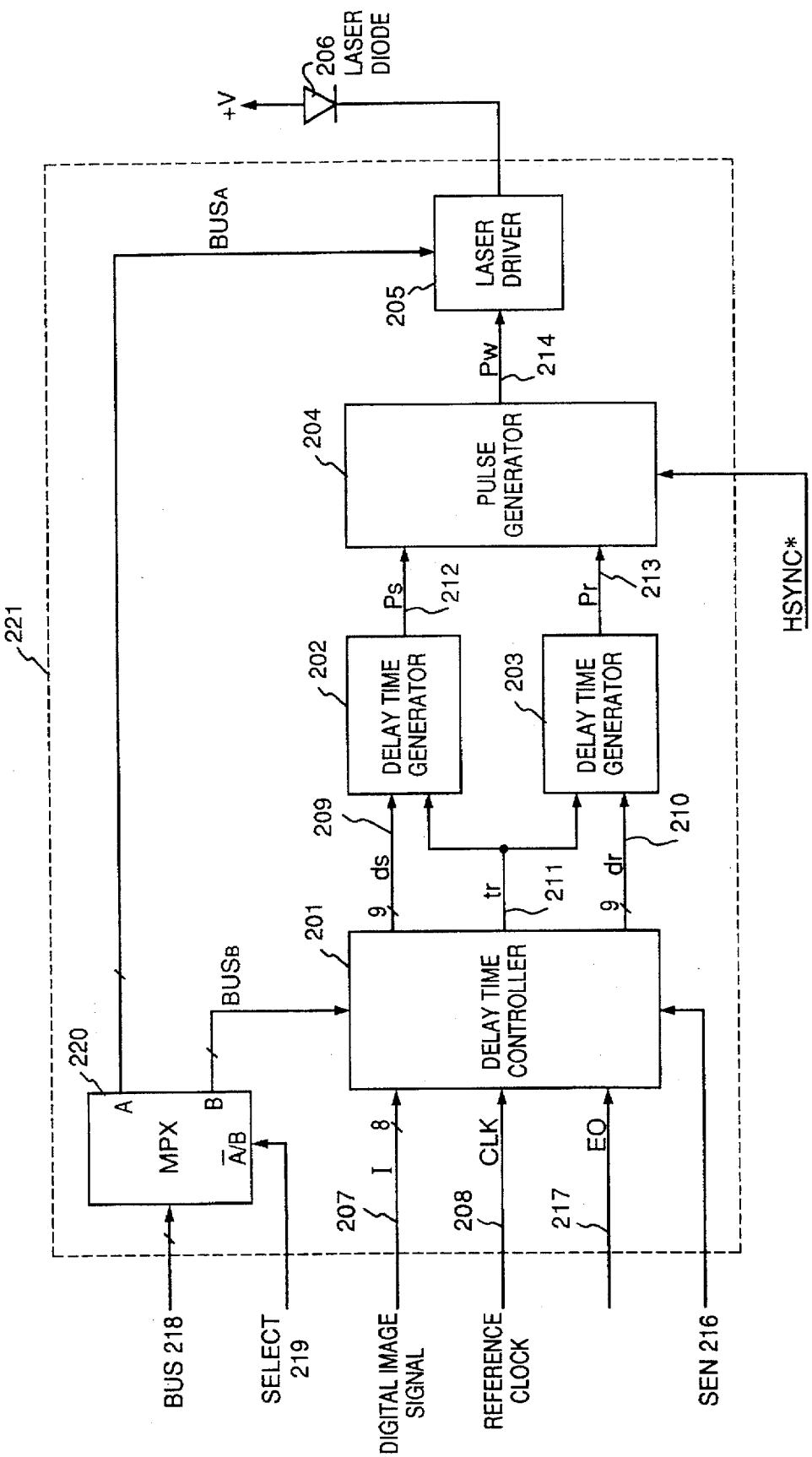
FIG. 11 is a block diagram showing a configuration for driving a semiconductor laser driver in a full-color copying machine according to a second embodiment.

FIG. 11 is a block diagram showing the configuration for driving a semiconductor laser in a full-color copying machine according to a second embodiment. It should be noted that the construction of an image forming apparatus according to this embodiment is identical to that of the first embodiment, therefore, the illustration and explanation of the construction will be omitted.

In FIG. 11, reference numeral 221 denotes a laser driver; and 207, a digital image signal I inputted into a delay time controller 201 in synchronization with a reference clock (CLK) 208. The delay time controller 201 inputs the digital image signal 207, the reference clock 208, an EO signal 217, for identification of a pixel in a CCD (not shown), as to whether it is an even pixel (pixel at second, fourth, sixth etc. position) or odd pixel (pixel at third, fifth, seventh etc. position), and a switching signal SEN 216 for character/picture image switching. The delay time controller 201 outputs two delay time seconds ds 209 and dr 210, and a trigger signal tr 211 in accordance with the image signal I 207, the CLK 208, the EO signal 217 and the SEN signal 216. Numerals 202 and 203 denote delay time generators for outputting pulse signals Ps 212 and Pr 213 having a predetermined pulse-width. These pulse signals are respectively delayed by a delay time, in accordance with the delay time data ds 209 and dr 210, and the trigger signal 211 which are inputted from the delay time controller 201.

Numeral 204 denotes a pulse generator which inputs the pulse signal Ps 212 and Pr 213 and generates a pulse signal Pw 214 having a pulse-width corresponding to the phase difference between the pulse signal Ps 212 and Pr 213. That is a rising edge of the pulse signal Pw 214 is determined by the pulse signal Ps 212, and a falling edge of the pulse signal Pw 214 is determined by the pulse signal Pr 213. Accordingly, the pulse-width of the pulse signal Ps 214 corresponds to the phase difference between the pulse signals Ps 212 and Pr 213.

Numeral 205 denotes a laser driver; 206, a semiconductor laser; and 215, a power supply for the semiconductor laser 206. The laser driver 205 inputs the pulse signal Pw 214, and turns the semiconductor laser 206 on and off for a time period corresponding to the pulse-width. Numeral 220 denotes a multiplexer which switches data from a bus (BUS)

Figure 17:
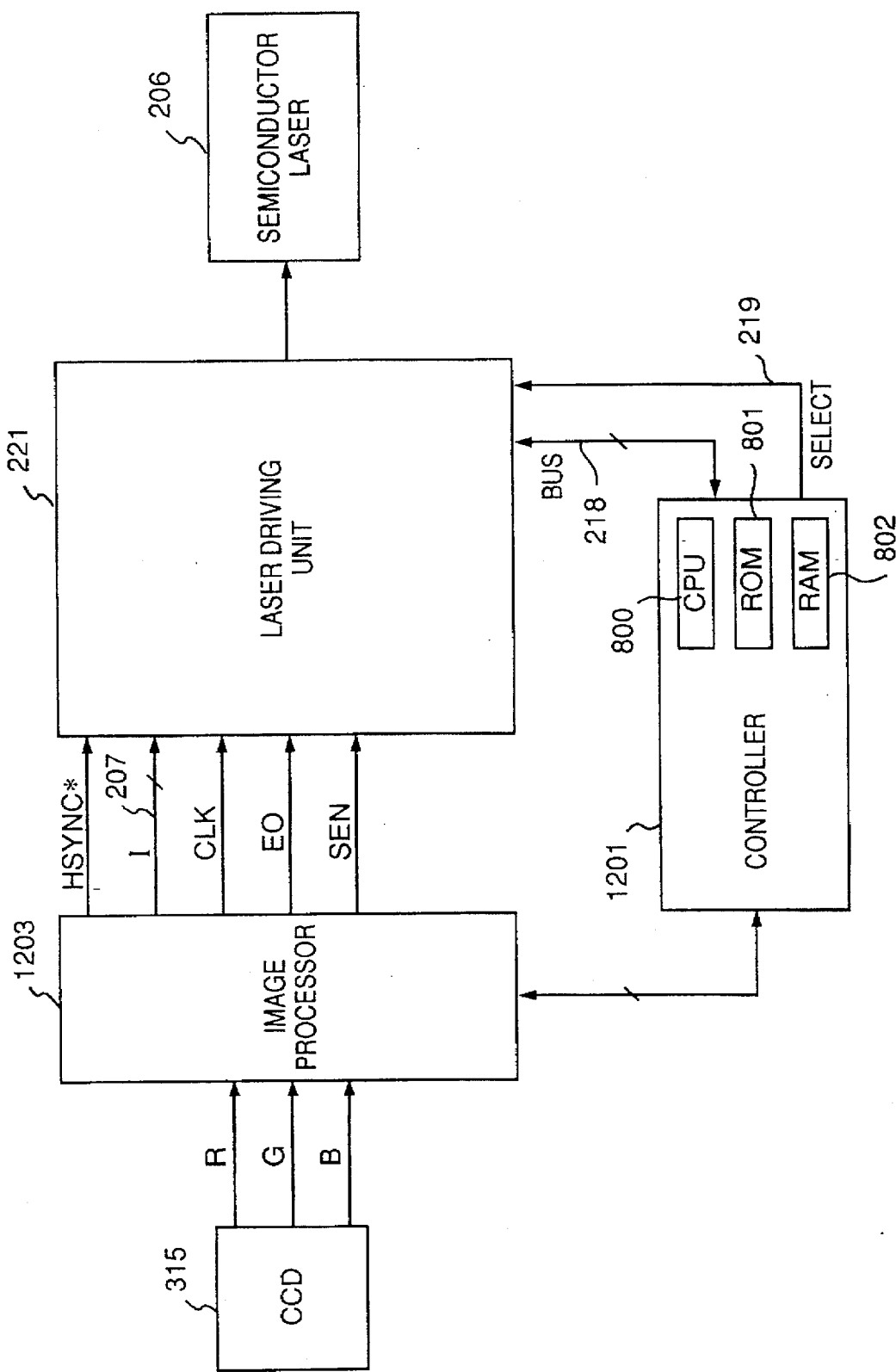
FIG. 17 is a block diagram showing the configuration of an image processor in the copying machine according to the second embodiment.

218 in accordance with a select signal 219 and outputs the data to a bus A (BUS$_A$) or a bus B (BUS$_B$). The bus B outputs an address signal, a data signal and an R/W* signal to the delay time controller 201. The bus A outputs, as will be described later, data for determining a current value to drive the semiconductor laser 206 to the laser driver 205. Data to these buses are outputted from a CPU 800 of a controller 1201 as shown in FIG. 17. Note that a signal marked "*" represents that the signal is a negative logic signal.

Figure 12:
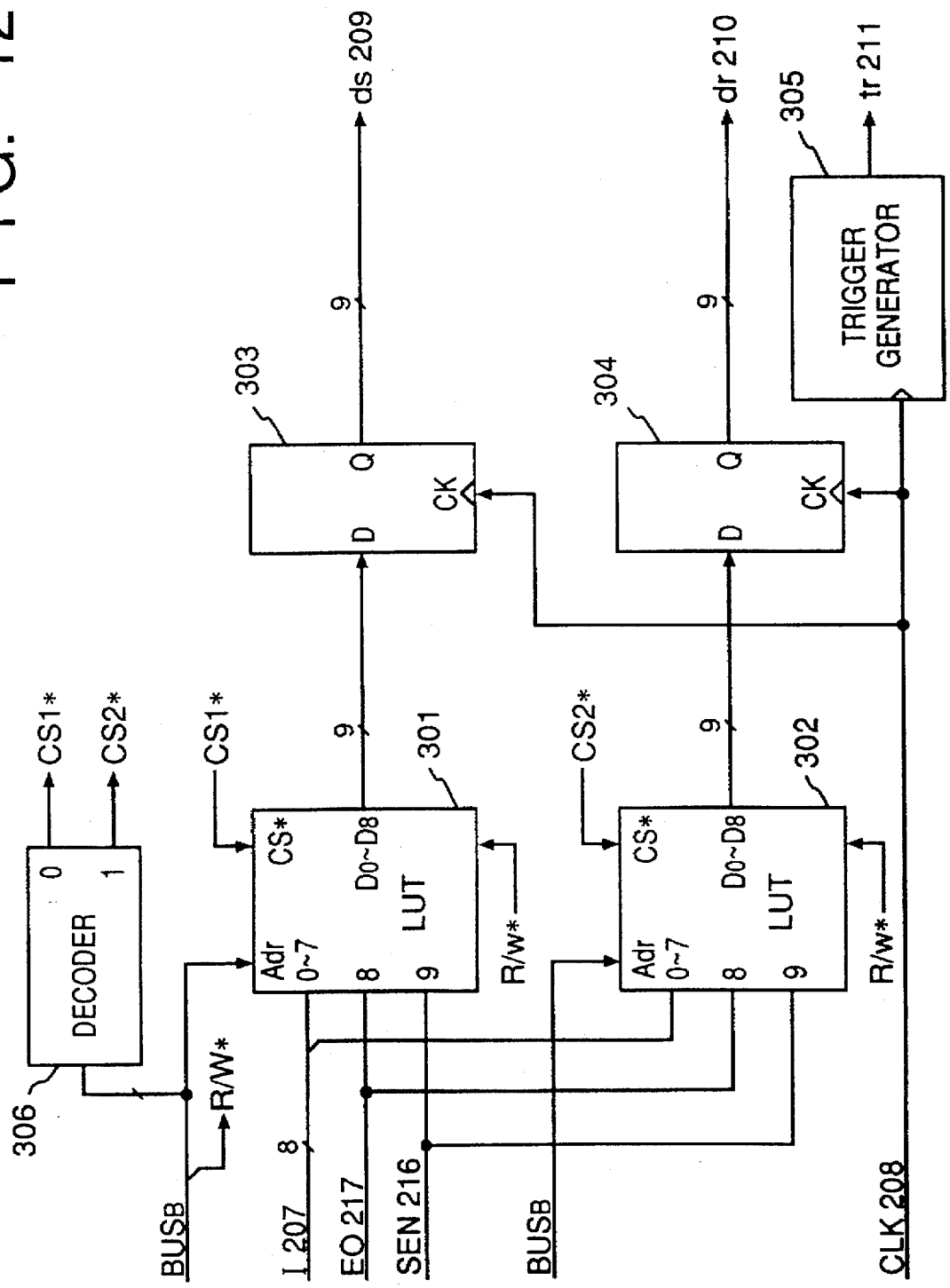
FIG. 12 is a block diagram showing in detail the construction of a delay time controller according to the second embodiment.

Next, the construction of the delay time controller 201 will be described in detail with reference to FIG. 12.

Numeral 301 and 302 denote look-up tables (LUT) using a dual port RAM. The CPU 800 of the controller 1201 in FIG. 17 can rewrite the contents of these RAM's 301 and 302 through the multiplexer 220 and the bus BUS B. Numeral 306 denotes a decoder which outputs chip select signals CS1* and CS2* for selecting one of the look-up tables 301 and 302. The signal R/W* is a signal for controlling reading and writing from/to the RAM's 301 and 302. When the logic level of the R/W* is high, reading from the LUT is performed, while writing to the LUT is performed when the logic level of the R/W* is low.

The image signal I 207, the even/odd identification signal EO 217, and the character-picture switching signal SEN 216 are inputted into an address input of the RAM's 301 and 302, then nine-bit data corresponding to the address input is outputted from output terminals $D_0$ to $D_8$. Thus, the respective nine-bit data outputted from the RAM's 301 and 302 are converted by flip-flops 303 and 304 to the signals ds 209 and dr 210 synchronized with the reference clock CLK 208, which is in synchronization with the image signal I 207. Numeral 305 denotes a trigger generator for generating the trigger signal tr 211.

Figure 13:
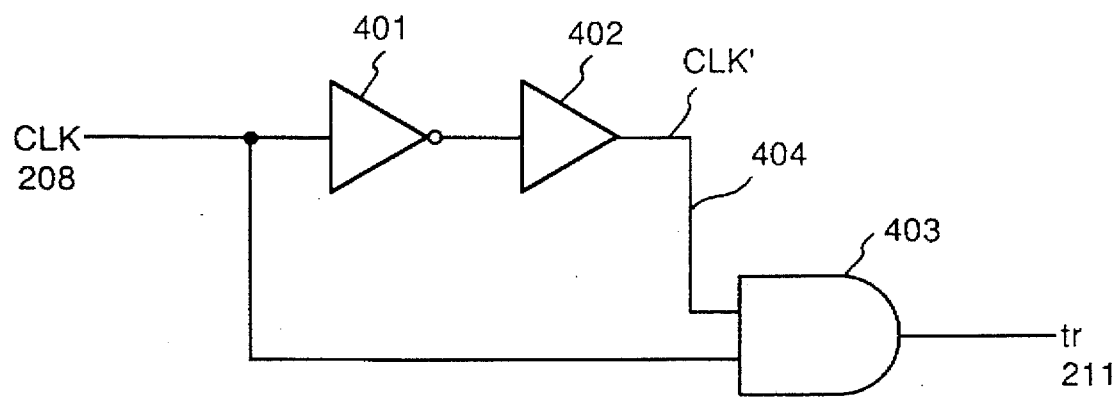
FIG. 13 is a block diagram showing in detail the construction of a trigger signal generator according to the second embodiment.

FIG. 13 is a block diagram showing in detail the construction of a trigger signal generator 305.

The CLK 208 passing through an inverter 401 and a delay device 402 becomes a clock CLK' 404. The CLK' 404 is inputted to an AND gate 403 together with the CLK 208. The AND gate 403 outputs a positive trigger signal tr 211 at a rising edge of the reference clock CLK 208.

Figure 14:
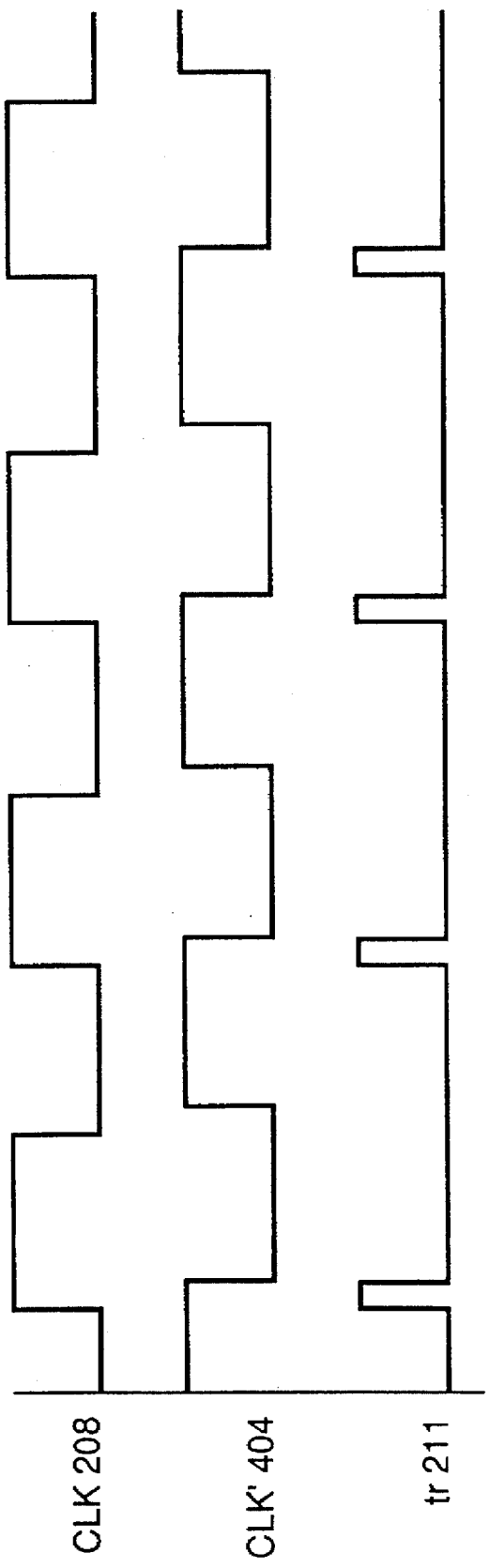
FIG. 14 is a timing chart showing signal timings in the trigger signal generator according to the second embodiment.

FIG. 14 shows signal timings in the trigger generator 305.

In the trigger generator 305, trigger signal tr 211 becomes a pulse signal having a pulse-width corresponding to the delay amount of the delay device 402. Note that RAM's rewritable by the CPU 800 are employed as the LUT's 301 and 302 so that the pulse-width of the pulse signal Pw 214 can be adjusted in correspondence with the digital image signal I 207 by rewriting the contents of these RAM's. As the semiconductor laser 206 varies in its characteristic, a constant laser power cannot be attained even if the laser has a current of the same value, or the laser is turned on for the same period of time. For this reason, the adjustment of the pulse-width of the pulse signal Pw 214 may be required.

It should be noted that the delay time generators 202 and 203 have the same construction as the delay time generators 102 and 103 of the first embodiment shown in FIG. 5.

Figure 15:
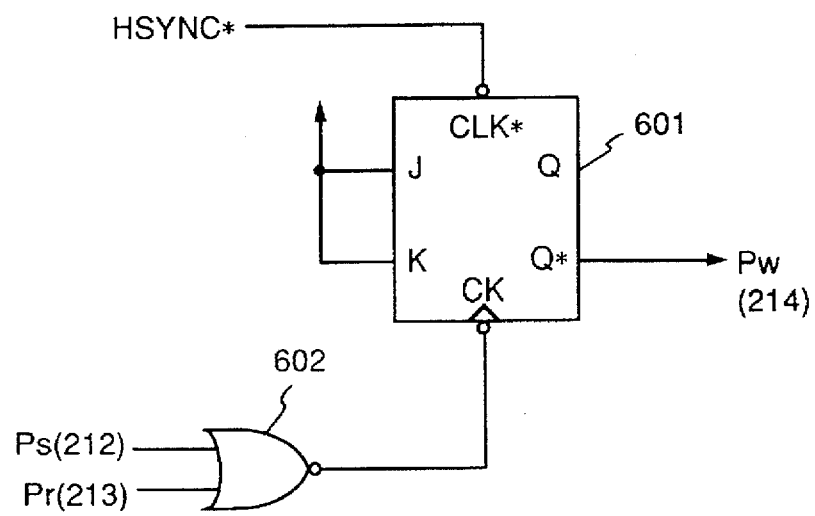
FIG. 15 is a block diagram showing in detail the construction of a pulse generator according to the second embodiment.

FIG. 15 is a block diagram showing the construction of the pulse generator 204 of the second embodiment.

In FIG. 15, numeral 601 denotes a J-K flip-flop which inverts the polarity of the signal Pw 214 and outputs the signal PW 214 from a terminal Q* at each time of a signal having a rising edge is inputted into a CK terminal. Thus, each time the signals Ps 212 and Pr 213 are inputted to a NOR gate 602, the polarity of the signal Pw 214 is inverted and then outputted. The input and output timings are identical to those shown in FIG. 7.

In the flip-flop 601, a horizontal synchronizing signal HSYNC* indicative of the beginning of one line of an image is inputted to a clear terminal CLR *. The HSYNC* is always set to a low level at the beginning of one line.

Figure 16:
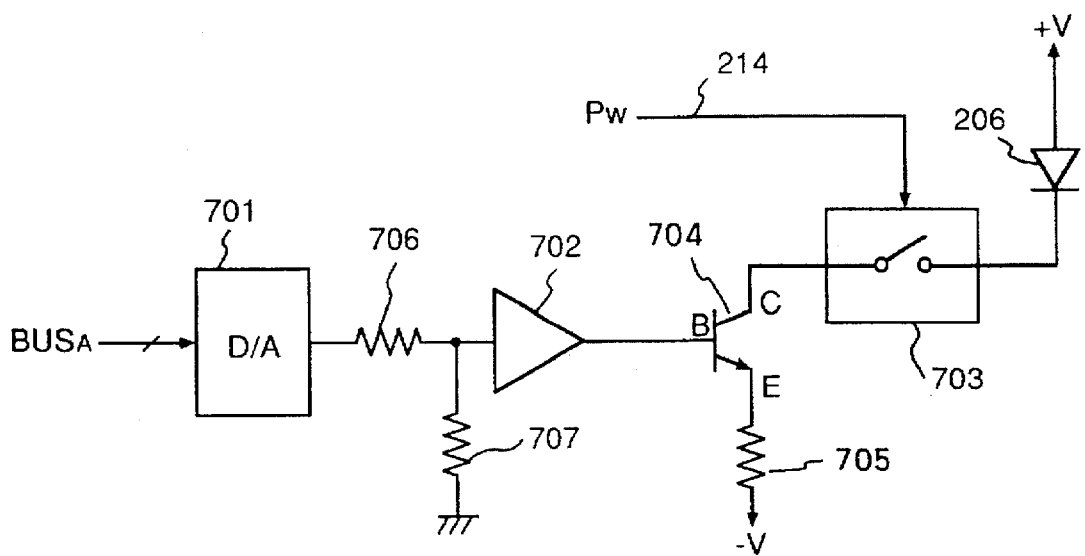
FIG. 16 is a block diagram showing in detail the construction of a laser driver according to the second embodiment.

FIG. 16 is a block diagram showing the construction of the laser driver 205.

Numeral 703 denotes a high-speed switching device for driving the semiconductor laser 206. The pulse signal Pw 214 generated by the pulse generator 204 is a control signal for the switching device 703. When the switching device 703 is turned on by the signal Pw 214, current flows from a power supply +V through a transistor 704, a resistor 705 to a power supply −V. At this time, the current value through the semiconductor laser 206 is substantially the same as the current value through the resistor 705.

If the base potential (B) of the transistor 704 is determined, then the potential of the emitter (E) is determined. As the potential developed across the resistor 705 is determined, the current through the resistor 705 can be obtained by dividing the voltage drop across the resistor 705 by the resistance value of the resistor 705

As the amount of light emitted by the semiconductor laser 206 depends on the current that flows in the semiconductor laser 206, the amount of light emitted by the semiconductor laser 206 is controlled by controlling the base (B) potential of the transistor 704. Numeral 701 denotes an A/D converter which inputs via the BUSA a value set by the CPU 800 to be described later. The D/A converter 801 outputs a voltage corresponding to the set value, and this voltage is divided by resistors 706 and 707 to obtain a voltage which is applied to the base (B) of the transistor 704 via a buffer 702.

In this manner, the CPU 800 controls the amount of light emitted by the semiconductor laser 206, because similar to the first embodiment, the semiconductor laser 206 varies in its characteristic, and a constant laser power cannot be attained even if the laser has current of the same value, or the laser is turned on for the same period of time.

As described above, as the delay time controller 201 adjusts the pulse-width of the laser driving pulse signal Pw 214, the laser driver 205 controls the current value which flows in the semiconductor laser 206.

For the adjustment of the current value, first, the semiconductor laser 206 is kept turned on, while the laser driver 205 adjusts the current value so that the emitting power becomes a predetermined value. In this case, a dynamic control for turning the laser 206 on is not utilized. Thereafter, the set current value is used for driving the laser 206.

Next, the delay time controller 201 adjusts the pulse-width so that the amount of light emitted becomes a predetermined amount at each of values "00H" and "FFH" indicated by the eight-bit digital image signal I 207 with the set current value. Then, the contents of the LUTs 301 and 302 shown in FIG. 12 are rewritten so that the pulse-width linearly changes in 256 tone levels expressed by values "00H" to "FFH".

The CPU 800 performs this adjustment using the address/data BUS$_A$ and BUS$_B$. As shown in FIG. 11, the select signal 219 switches the multiplexer 220 to reroute a single address/data bus BUS 218 to either the BUS$_A$ or the BUS$_B$.

Next, the configuration of an image processor in the copying machine according to the second embodiment will be described with reference to a block diagram of FIG. 17.

In FIG. 17, numeral 315 denotes a CCD which outputs an RGB signal to an image processor 1203. The image processor outputs the processed signal as the digital image signal I 207 to the laser driving unit 221. A controller 1201 has the CPU 800 comprising e.g. a microprocessor, a ROM 801 storing control programs for the CPU 800 and various data, and a RAM 802 used as a work area for the CPU 800 upon control operation by the CPU 800.

The CPU 800 of the controller 1201 writes a value via the bus $BUS_B$ in advance corresponding to the image signal (an address in the RAM) in the RAM's 301 and 302 which act as the LUT's of the delay time controller 201. This value becomes the aforementioned delay amounts ds and dr corresponding to the image signal I, and each delay time beginning from a rising edge of the reference clock signal CLK can be set based on these values. The pulse generator 204 outputs a signal by performing a pulse-width modulation on the image signal I 207 based on each delay time. Further, the CPU 800 outputs digital data to the D/A converter 701 in the laser driver 205 via the bus $BUS_A$, to change the current value that flows through the semiconductor laser 206. The control program for executing this operation is stored in the ROM 801.

It should be noted that in this construction, the laser driving unit 221 is preferably provided on the same circuit board to prevent noise which will be mixed with the driving signal for the semiconductor laser 206. Further, in this construction, all the circuits can be formed on a single chip since the device generating processes used in these circuits are the same each other. Using the multiplexer 220 reduces the number of signal lines for laser adjustment, which also reduces the number of wires from the circuit board. If the laser driving unit 221 is formed as one chip, the number of pins of a package on which the unit is located can be reduced.

<Modification>

Figure 18:
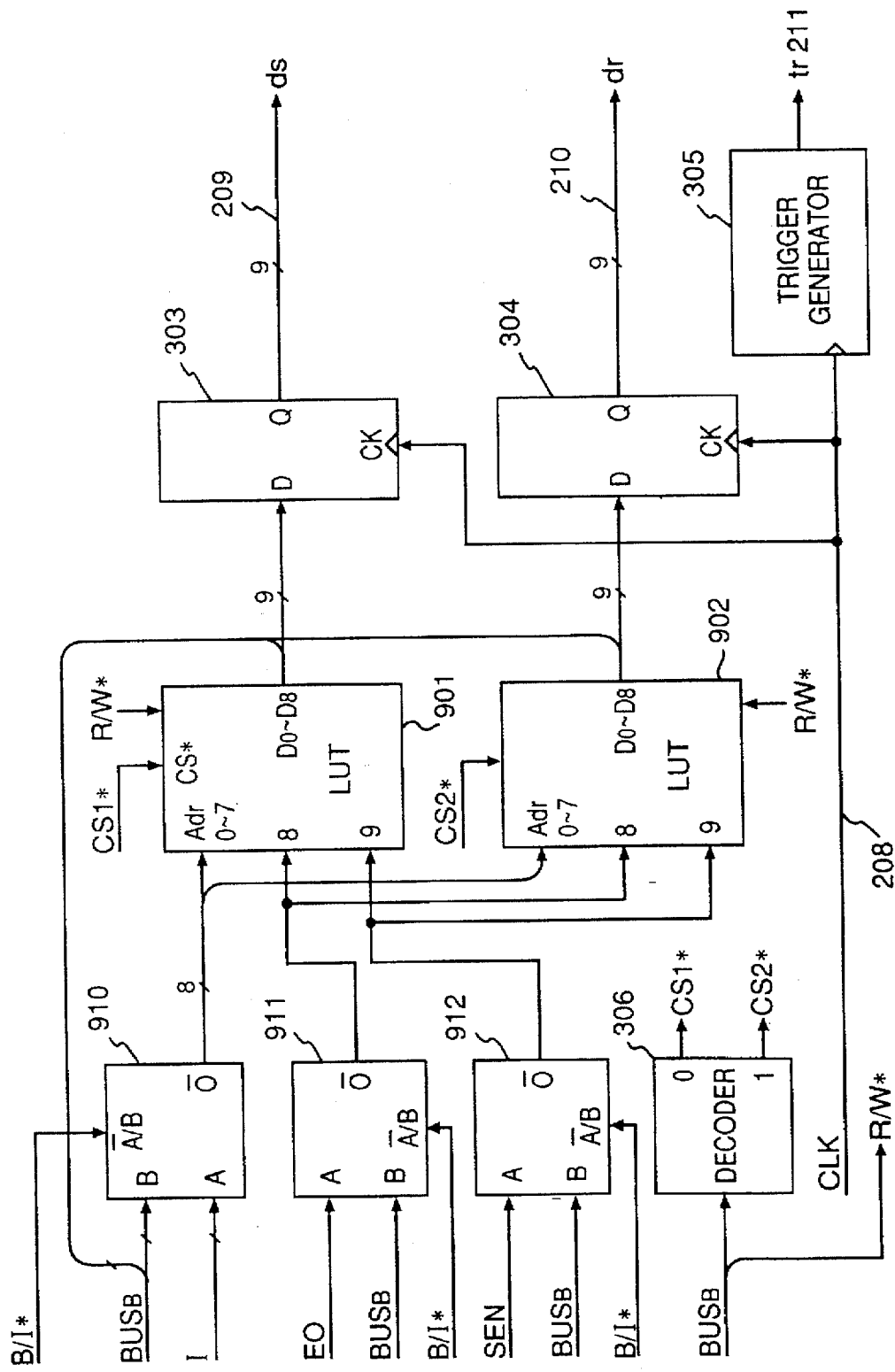
FIG. 18 is a block diagram showing in detail the construction of a delay time controller according to a modification to the second embodiment.

The second embodiment employs a dual port RAM for the look-up tables 301 and 302 in the delay time controller 201. However, the look-up tables of the present invention are not limited to the dual port RAM, for example, a normal RAM can be used. In this case, as shown in FIG. 18, the look-up tables comprise RAM's 901 and 902, and multiplexers 910, 911 and 12 switch a writing address to the RAM's 901 or 902 via the $BUS_B$. Upon reading from the RAM's 901 and 902, the signals I, EO, SEN are selected. The switching of input signals to the RAM's 901 and 902 is triggered by a B/I* signal.

Figure 19:
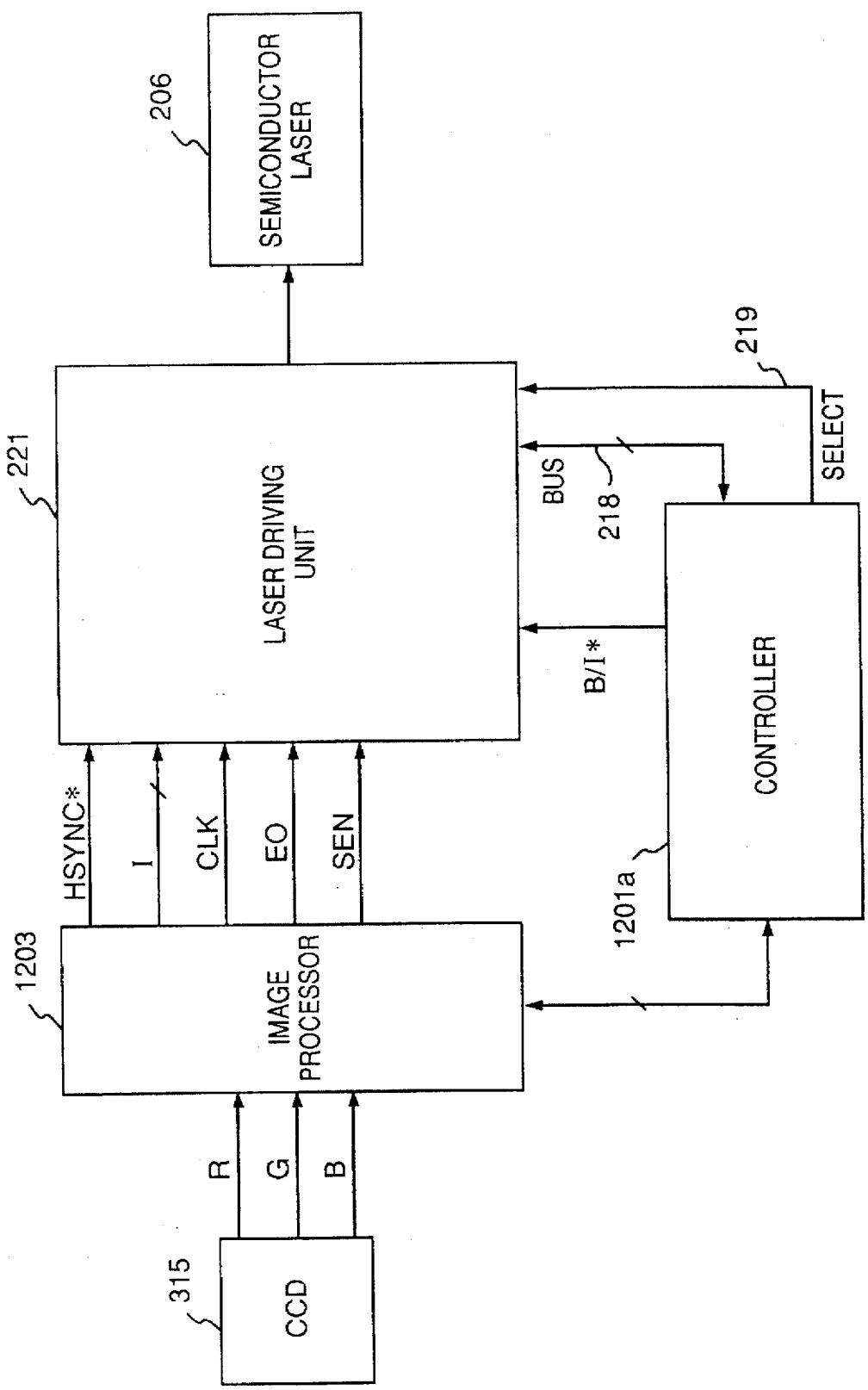
FIG. 19 is a block diagram showing the configuration of an image processor according to the modification.

FIG. 19 is a block diagram showing the construction of the image processor according to a modification to the second embodiment. Unlike the image processor shown in FIG. 17, the B/I* signal is outputted from a controller 1201a in this modification.

As described above, by integrating a circuit which outputs a pulse signal for driving the semiconductor laser and a circuit for driving the semiconductor laser, the number of signal lines for adjusting and controlling these circuits can be reduced.

[Third Embodiment]

A color printer according to the third embodiment will be described below. The printer has the same construction as that of the color image forming apparatus according to the first embodiment, therefore, the explanation of the printer will be omitted.

Figure 20:
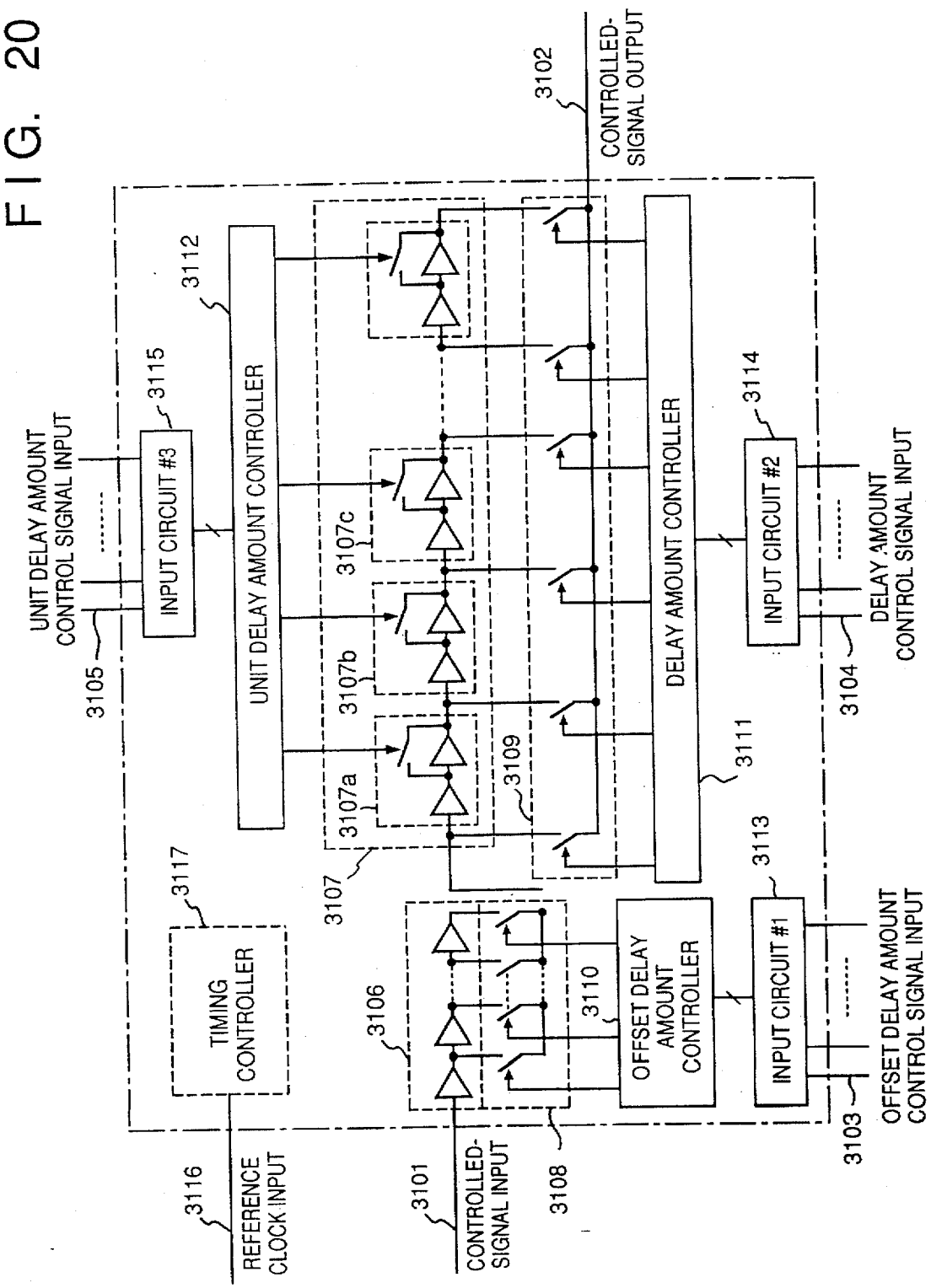
FIG. 20 is a block diagram showing the construction of a digital delay device in a color printer according to a third embodiment.

FIG. 20 is a block diagram showing the construction of a digital delay device in the color printer according to the third embodiment. In this color printer, a controlled-signal input 3101 is outputted as a controlled-signal output 3102 having a predetermined delay amount.

A first delay generator 3106 comprises a device having a predetermined delay amount which is changed by a first switching circuit 3108 controlled by an offset delay amount controller 3110. A second delay amount generator 3107 comprises unit delay amount generators 3107a, 3107b, . . . , each of which has a predetermined delay amount. The delay amount of the second delay amount generator 3107 is changed by a second switching circuit 3109 controlled by a delay controller 3111.

Note that the unit delay amount generators 3107a, 3107b, . . . changes the unit delay amounts under the control of a unit delay amount controller 3112.

An offset delay amount control signal input 3103 comprises a plurality of digital signals inputted into the offset delay amount controller 3110 via an input circuit #1 3113. The unit delay amount controller 3112 inputs the plurality of signals inputted as a unit delay amount control signal input 3105 via an input circuit #3 3115.

A timing controller 3117 controls timings of respective input/output signals and internal circuits comprising the given digital delay device, based on a reference clock signal inputted from a reference clock input terminal 3116.

Next, a laser driving system of the present color printer will be described below.

Figure 21:
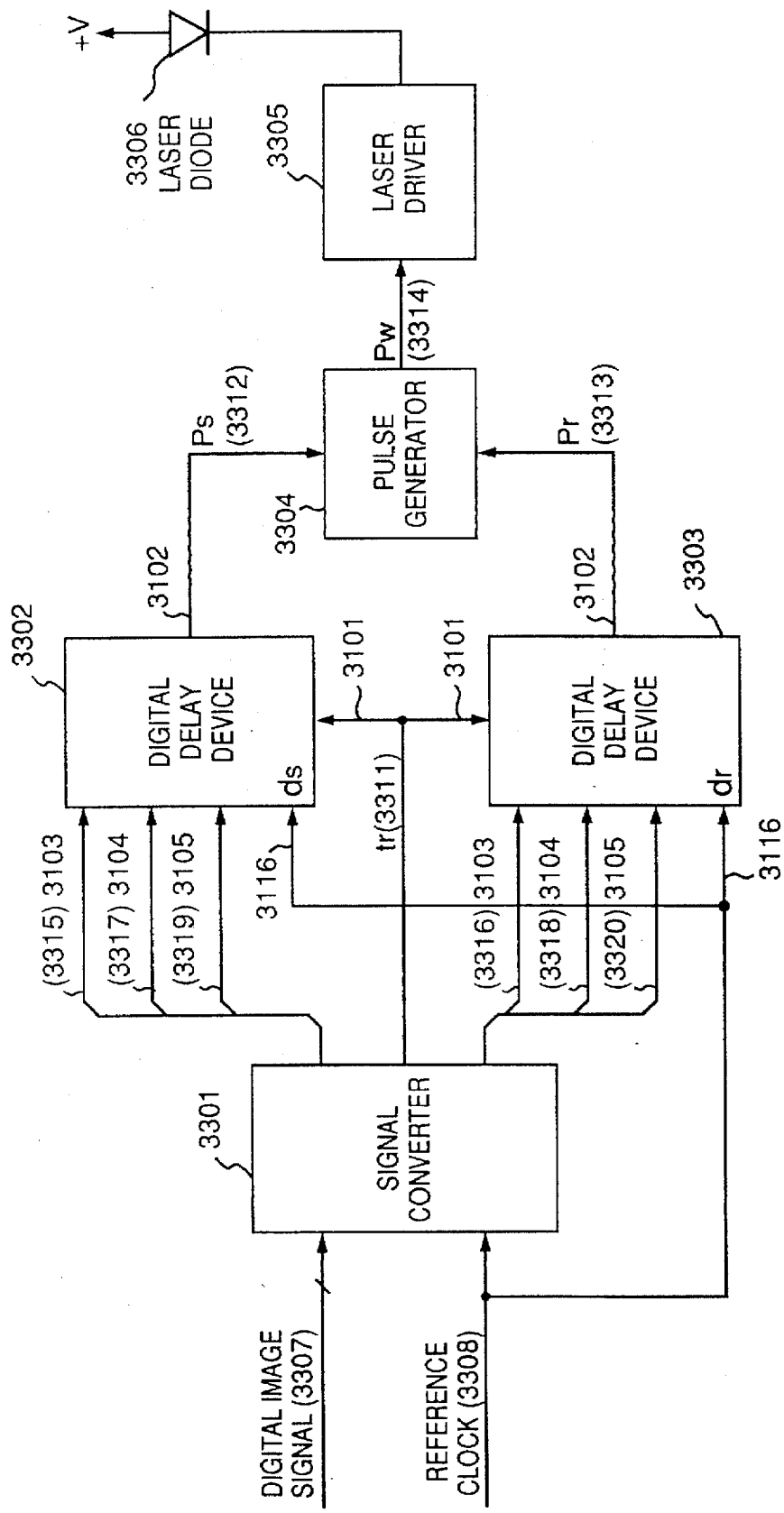
FIG. 21 is a block diagram showing the construction of a laser driving system according to the third embodiment.

FIG. 21 is a block diagram showing the construction of the laser driving system according to the third embodiment. In FIG. 21, a digital image signal 3307 is inputted to a signal converter 3301 in synchronization with a reference clock 3308. The signal converter 3301 outputs offset delay amount control signals 3315 and 3316, delay amount control signals 3317 and 3318, unit delay amount control signals 3319 and 3320, and a reference signal tr 3311, which are contained in the digital image signal 3307, based on the reference clock 3308.

Digital delay devices 3302 and 3303, having the construction as shown in FIG. 20, input the offset delay amount control signals 3315 and 3316, the delay amount control signals 3317 and 3318, the unit delay amount control signals 3319 and 3320, and the reference signal tr 3311. And the devices 3302, 3303 output pulse signals Ps 3312 and Pr 3313 having a predetermined pulse-width, which lag the reference signal tr 3311 by a delay time set by the control signals 3315 to 3320. The pulse generator 3304 inputs the pulse signals Ps 3312 and Pr 3313 to generate a pulse signal Pw 3314 having a pulse width corresponding to the phase difference between these two pulse signals. That is, the pulse signal Ps 3312 sets the rising edge of the pulse signal Pw 3314, while the pulse signal Pr 3313 sets the falling edge of the pulse signal Pw 3314.

Accordingly, similar to the first embodiment, the pulse-width of the pulse signal Pw 3314 is equal to the phase difference between the pulse signals Ps 3312 and Pr 3313.

The laser driver 3305 inputs the pulse signal Pw 3314, and turns the semiconductor laser 3306 on for a period of time corresponding to the pulse-width. Note that the power +V is supplied to semiconductor laser 3306.

It should be noted that the signal timings in a case where the digital image signal 3307 indicates character/picture data are the same as those shown in the timing charts of FIGS. 3 and 4, according to the first embodiment.

As described above, in a case where the recording density is changed to an integral multiple of a period of a reference clock in correspondence with the type of image, e.g., a character image and a picture image, an input digital image signal is synchronized with the reference clock to control a unit delay amount, thus enabling a faster setting of the delay time, and an increase in high-precision and stability of the set value.

<Modification>

Figure 22:
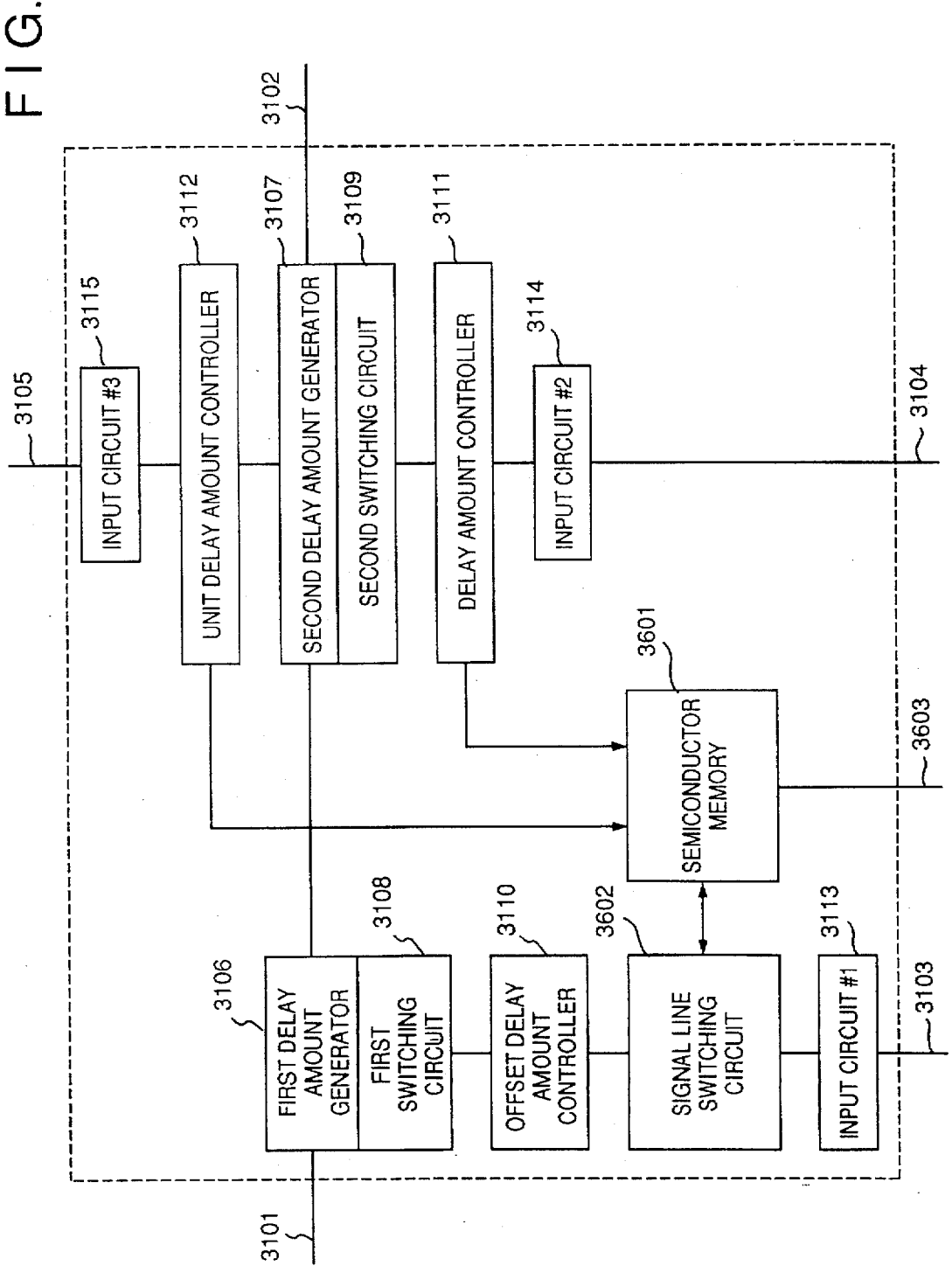
FIG. 22 is a block diagram showing the construction of a digital delay device according to a modification to the third embodiment.

FIG. 22 is a block diagram showing the construction of a digital delay device according to a modification to the third embodiment. In FIG. 22, elements corresponding to those of the digital delay device in the third embodiment shown in FIG. 20 have the same reference numerals, and the explanation of those elements will be omitted.

The delay device of this modification changes control of the second delay amount generator 3107 in order to raise the precision of a set value and to vary the change rate of the value. At the same time, the device also changes control of the first delay amount generator 3106 in accordance with the change of control of the second delay amount generator 3107.

In this case, the delay device has a semiconductor memory 3601, that is, a memory device to which data is rewritable. In the memory, a control pattern for controlling the first delay amount generator 3106 is stored in advance. This control pattern corresponds to a delay amount to be set. The offset delay amount controller 3110 reads out the control pattern corresponding to the set delay amount from the semiconductor memory 3601, and switches the first switching circuit 3108.

It should be noted that since the control pattern is rewritable, it can cope with the change in the delay amount which will be caused by environmental change of the device and even as the device ages.

In the delay device according to the modification, the semiconductor memory 3601 is controlled by a signal line switching circuit 3602 which inputs a memory control signal 3603.

If it is required to lineraly compensate for the change in the delay amount, a delay amount control signal input 3104 is used to set a delay amount, and an offset delay amount control signal input 3103 is used to set a delay amount for a fine adjustment. Then, the set value of the offset delay amount control signal input 3103 is changed while observing a delay amount of the controlled-signal input 3102. When the value of the offset delay amount control signal input 103 becomes a predetermined value, the value is written into the semiconductor memory 3601. This operation is performed for each set value.

Thereafter, when a delay value is set by the delay amount control signal input 3104, the offset delay amount controller 3110 reads a predetermined control pattern out from the semiconductor memory 3601 and controls the first delay amount generator 3106.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus which performs pulse-width modulation on an image signal for image tone representation, comprising:
   means for determining a first delay amount and a second delay amount based on a tone level of the image signal;
   first delay means for delaying a predetermined signal by the first delay amount and for generating a first signal;
   second delay means for delaying the predetermined signal by the second delay amount and for generating a second signal; and
   means for generating a pulse-width modulation signal based on the first and second signals.

2. The apparatus according to claim 1, wherein the first delay amount corresponds to a leading edge of the pulse-width modulation signal, while the second delay amount corresponds to a trailing edge of the pulse-width modulation signal.

3. An image processing apparatus which performs pulse-width modulation on an image signal for image tone representation, comprising:
   means for determining a delay amount based on a gradation level of the image signal;
   delay means for delaying a predetermined signal by the delay amount; and
   means for generating a pulse-width modulation signal based on an output from said delay means,
   wherein said apparatus has an output mode for outputting a pulse-width modulation signal having one pulse with respect to one pixel, and an output mode for outputting a pulse-width modulation signal having one pulse with respect to a plurality of pixels.

4. An image processing apparatus which drives light emitting means based on a signal obtained by performing pulse-width modulation on an image signal for image tone representation, comprising:
   input means for inputting data;
   a memory for storing a plurality of delay amounts;
   delay means for delaying a predetermined signal by the delay amount stored in said memory and selected in accordance with the level of the image signal;
   means for generating a pulse-width modulation signal based on an output from said delay means; and
   means for controlling the amount of light emitted by said light emitting means,
   wherein said apparatus has a mode for renewing the delay amount(s) stored in said memory based on the data from said input means, and a mode for controlling said amount of light by said control means based on the data from said input means.

5. An image processing apparatus which performs pulse-width modulation on an image signal for image tone representation, comprising:
   means for determining a first delay amount based on a gradation level of the image signal;
   means for variably setting a second delay amount regardless of a gradation level of the image signal;
   delay means for delaying a predetermined signal based on the first and second delay amount; and
   means for generating a pulse-width modulation signal based on an output from said delay means.

6. The apparatus according to claim 1, wherein said apparatus has a first mode, in which both first and second signals are generated in response to one pulse of the predetermined signal and a second mode, in which one of the first and second signals is generated in response to one pulse of the predetermined signal.

7. The apparatus according to claim 6, wherein if the image signal represents a character, said apparatus operates in the first mode.

8. The apparatus according to claim 6, wherein if the image signal represents a half-tone image, said apparatus operates in the second mode.

9. The apparatus according to claim 1, wherein a leading and trailing edges of a pulse associated with the pulse width-modulation signal are specified by the first and second signals.

10. The apparatus according to claim 1, wherein the first and second delay means are capable of setting an offset delay amount, a delay amount and a unit delay amount.

11. The apparatus according to claim 10, wherein the offset delay amount, the delay amount and the unit delay amount are independently controlled.

12. The apparatus according to claim 10, wherein the offset delay amount varies in correspondence with a change in the delay amount and the unit delay amount.

13. The apparatus according to claim 12, wherein a pattern of the change of the delay amount and the unit delay amount is stored in a memory in advance, and the offset delay amount varies in accordance with the pattern read out of the memory.

14. The apparatus according to claim 13, wherein the pattern is rewritable in correspondence with an environmental change and a secular change of said apparatus.

15. The apparatus according to claim 1, further comprising a light source for emitting a light modulated with the pulse-width modulation signal and means for adjusting a current to be supplied to the light source.

* * * * *

UNITED STATES PATENT AND TRADEMARK OFFICE
CERTIFICATE OF CORRECTION

PATENT NO. : 5,677,725

DATED : October 14, 1997

INVENTORS : TSUNAO HONBO ET AL.　　　　　　　　　Page 1 of 3

It is certified that error appears in the above-identified patent and that said Letters Patent is hereby corrected as shown below:

ON TITLE PAGE

[54] Title "PERFORMING" should read --FOR FORMING--.

IN THE DRAWINGS

Sheet 2 of 21　FIG. 2 "DATA" should read --OF DATA--;
Sheet 5 of 21　FIG. 5 "DECORDER" should read --DECODER--.

COLUMN 1 line 2, "PERFORMING" should read --FOR FORMING--;
line 29, "of" (first occurrence) should be deleted;
line 60, "com-" should be deleted;
line 61, "prising:" should be deleted.

COLUMN 2 line 37, "as" should be deleted.

COLUMN 4 line 8, "of" should read --to--.

UNITED STATES PATENT AND TRADEMARK OFFICE
CERTIFICATE OF CORRECTION

PATENT NO. : 5,677,725

DATED : October 14, 1997

INVENTORS : TSUNAO HONBO ET AL.

It is certified that error appears in the above-identified patent and that said Letters Patent is hereby corrected as shown below:

<u>COLUMN 6</u> line 31, "grater" should read --greater--;
   line 38, "data" should read --of data--;
   line 54, "Modifications" should read --¶ Modifications--;
   line 66, "Circuit" should read --In a circuit--.

<u>COLUMN 8</u> line 43, "seconds" should read --signals--;
   line 56, "is" should read --is,--.

<u>COLUMN 9</u> line 11, "Numeral 301" should read --Numerals 301--;
   line 60, "of" should be deleted.

<u>COLUMN 10</u> line 25, "BUSA" should read --$BUS_A$--.

<u>COLUMN 11</u> line 24, "same" should read --same as--;
   line 37, "12" should read --912--.

UNITED STATES PATENT AND TRADEMARK OFFICE
CERTIFICATE OF CORRECTION

PATENT NO. : 5,677,725

DATED : October 14, 1997

INVENTORS : TSUNAO HONBO ET AL.

It is certified that error appears in the above-identified patent and that said Letters Patent is hereby corrected as shown below:

<u>COLUMN 12</u> line 6, "changes" should read --change--.

<u>COLUMN 13</u> line 29, "lineraly" should read --linearly--.

<u>COLUMN 14</u> line 63, "a" should be deleted.

Signed and Sealed this

Fifth Day of May, 1998

*Attest:*

BRUCE LEHMAN

*Attesting Officer*     *Commissioner of Patents and Trademarks*